United States Patent [19]
Takahashi

[11] Patent Number: 6,046,989
[45] Date of Patent: Apr. 4, 2000

[54] MULTICAST CONNECTION MANAGEMENT SYSTEM

[75] Inventor: Eiichiro Takahashi, Kawasaki, Japan

[73] Assignee: Fujitsu Limited, Kanagawa, Japan

[21] Appl. No.: 08/990,627

[22] Filed: Dec. 15, 1997

[30] Foreign Application Priority Data

Apr. 15, 1997 [JP] Japan ................................. 9-097674

[51] Int. Cl.$^7$ .............................. H04J 3/24; H04H 1/00
[52] U.S. Cl. ........................ 370/312; 370/389; 370/432
[58] Field of Search ................................. 370/255, 276, 370/277, 278, 282, 285, 351, 352, 353, 354, 355, 356, 357, 389, 390, 392, 395, 432, 410, 312

[56] References Cited

U.S. PATENT DOCUMENTS

| | | | |
|---|---|---|---|
| 5,329,527 | 7/1994 | Ujihashi et al. | 370/397 |
| 5,732,071 | 3/1998 | Saito et al. | 370/225 |

*Primary Examiner*—Ajit Patel
*Assistant Examiner*—Bob A. Phunkulh
*Attorney, Agent, or Firm*—Helfgott & Karas, P.C.

[57] ABSTRACT

A multicast connection management system includes: a registration unit for searching, in response to a request issued from a subscribing multicast service user for registration of connection, an originating user management table for connection information of a circuit carrying the request so as to retrieve a pointer indicating one of target user connection management tables, and for registering a requested target address and circuit information of a target user assigned the requested target address; and a transmission unit for transmitting, when the subscribing multicast service user supplies user data, the user data to the target user assigned the target address registered in the target user connection management table means indicated by the pointer obtained by searching the originating user management table means. With this arrangement, multicast communication with a plurality of registered users assigned respective target addresses and dynamic updating of a multicast connection group are provided.

6 Claims, 23 Drawing Sheets

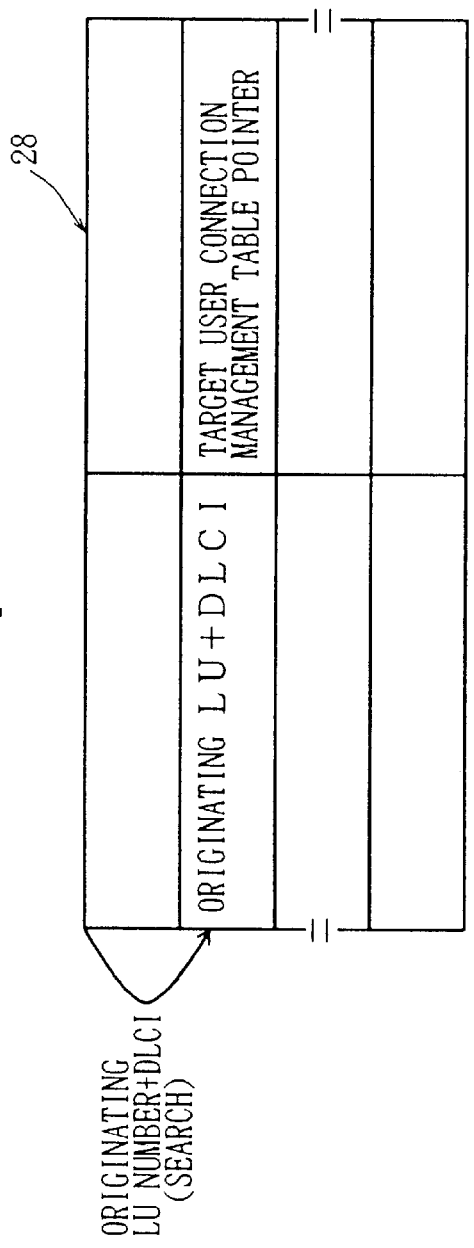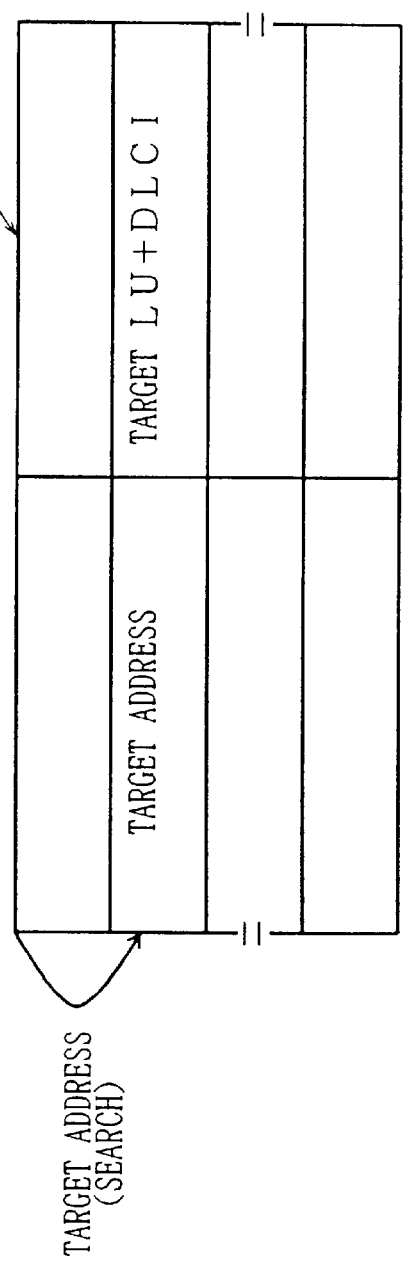

MULTICAST CONNECTION MANAGEMENT SYSTEM

BACKGROUND OF THE INVENTION

1. Field of the Invention

The present invention generally relates to multicast connection management systems and, more particularly, to a system for managing a network in which multicast service using packet data is provided.

2. Description of the Related Art

Multicast service in the form of 1:n broadcasting or n:n broadcasting is provided in known packet data communication systems such as a frame relay system and a packet switching system. In the conventional multicast service, all of such connections are a permanent virtual circuit (PVC) connection (permanent connection). Multicast service using switched virtual circuit (SVC) connection (switched connection) and enabling dynamic connection registration has not been provided.

In the field of packet data communication such as frame relay and packet switching, there is a growing demand for building inter-LAN communication and for building intranets using multicast connection. Since the connections in the conventional multicast service are PVC connections without an exception, the multicast service is available to only a limited number of users. While users of the inter-LAN communication and intranets wishing to benefit from multicast service vary depending on the application, the conventional multicast service is not capable of adapting for such a variation by dynamically updating the multicast connection group.

SUMMARY OF THE INVENTION

Accordingly, an object of the present invention is to provide a multicast connection management system in which the aforementioned problem is eliminated.

Accordingly, an object of the present invention is to provide a multicast connection management system enabling dynamic updating of multicast connection groups.

The aforementioned objects can be achieved by a multicast connection management system in a packet data communication network providing a multicast service, comprising: user connection management means for managing, in relation to each of subscribing multicast service users, target addresses and user identification information of target users assigned the target addresses; and registration means for registering, in response to a request from the subscribing multicast service user, the requested target address and the user identification information of the target user assigned the requested target address, in the user connection management means related to the requesting subscribing multicast service user.

According to this aspect of the invention, a multicast connection group can be dynamically updated by registering, in relation to each subscribing multicast service user, target (destination) addresses and identification information of users having those target addresses.

The aforementioned objects can also be achieved by a multicast connection management system in a packet data communication network provided with a multicast server for providing a multicast service, comprising: a plurality of target user connection management table means provided for subscribing multicast service users so as to register target addresses and circuit information of target users assigned the target addresses, in such a manner as to relate each of the target addresses to the corresponding circuit information; an originating user management table means for registering the circuit information of the subscribing multicast service users and pointers for indicating one of the plurality of target user connection management table means in such a manner as to relate each of the pointers to the corresponding circuit information; searching means for searching, in response to a request issued from the subscribing multicast service user for registration of multicast connection with one of the target addresses, the originating user management table means for the circuit information of a circuit carrying the request, so as to retrieve the pointer indicating one of the plurality of target user connection management table means; registration means for registering a requested target address specified by the request and the circuit information of the target user assigned the requested target address, in the target user connection management table means indicated by the pointer; and transmission means for transmitting, when the subscribing multicast service user supplies user data, the user data to the target user assigned the target address registered in the target user connection management table means indicated by the pointer obtained by searching the originating user management table means.

This aspect of the invention provides multicast communication with a plurality of registered users having respective target addresses, by registering, in the target user connection management table, the target addresses and the circuit information in relation to a registered multicast service user, and by supplying user data from the registered multicast service user. By registering the target address and the associated user circuit information in the target user connection management table, the multicast connection group can be dynamically updated.

BRIEF DESCRIPTION OF THE DRAWINGS

Other objects and further features of the present invention will be apparent from the following detailed description when read in conjunction with the accompanying drawing, in which:

FIG. 5A shows an originating user management table;

FIG. 5B shows a target user connection management table;

DESCRIPTION OF THE PREFERRED EMBODIMENTS

Figure 1A:
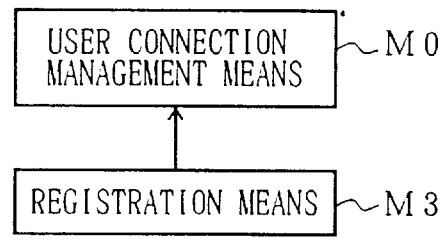
FIGS. 1A, 1B and 1C show the principle of the multicast connection management system according to the present invention.
Figure 1B:
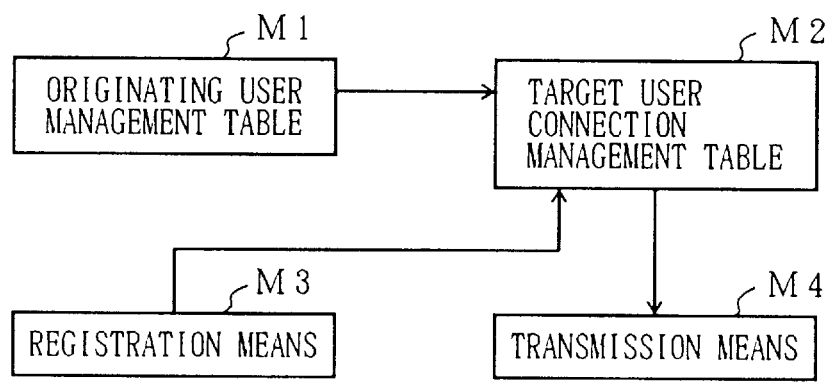
Figure 1C:
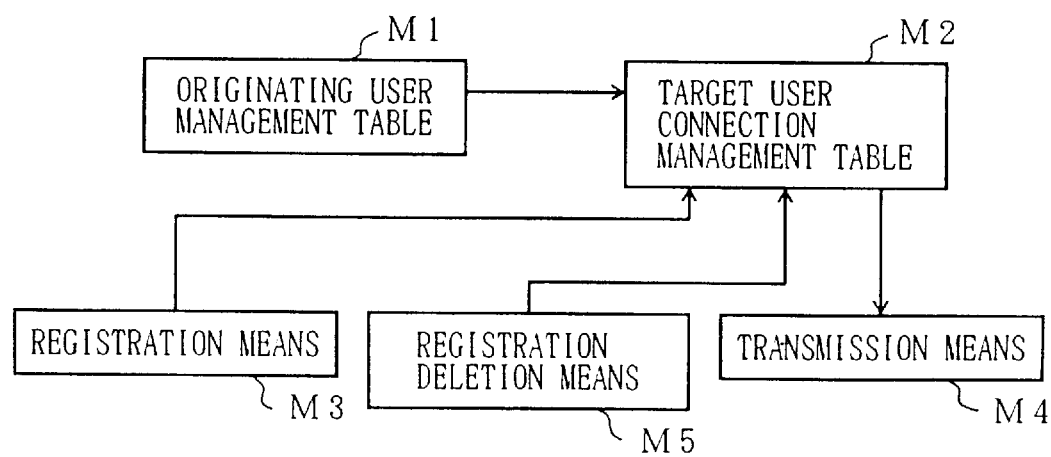

FIGS. 1A, 1B and 1C show the principle of the multicast connection management system according to the present invention. Referring to FIG. 1A, the multicast connection management system operates in a packet data communication network providing a multicast service. The multicast connection management system comprises user connection management means M0 for managing target addresses (addresses of destination users) and corresponding user identification information, and registration means M3 for registering, in response to a request from a user subscribing to the multicast service, a requested target address and user identification information of the user assigned the target address, in the user connection management means M0.

Referring to FIG. 1B, the multicast connection management system may comprise a plurality of target user connection management tables M2 provided for subscribing multicast service users so as to register target addresses and circuit information of target users assigned the target addresses, in such a manner as to relate each of the target addresses to the corresponding circuit information. The system may further include an originating user management table M1 for registering the circuit information of the subscribing multicast service users and pointers for indicating one of the plurality of target user connection management tables in such a manner as to relate each of the pointers to the corresponding circuit information. The system may further include transmission means M4 for transmitting, when the subscribing multicast service user supplies user data, the user data to the target user assigned the target address registered in the target user connection management table indicated by the pointer obtained by searching the originating user management table.

Referring to FIG. 1C, the system may further include registration deletion means M5 for deleting, in response to a request issued from the subscribing multicast service user for cancellation of the multicast connection (disconnection), the target address of the multicast connection and the circuit information of the target user assigned the target address of the multicast connection, from the target user connection management table indicated by the pointer.

Figure 2:
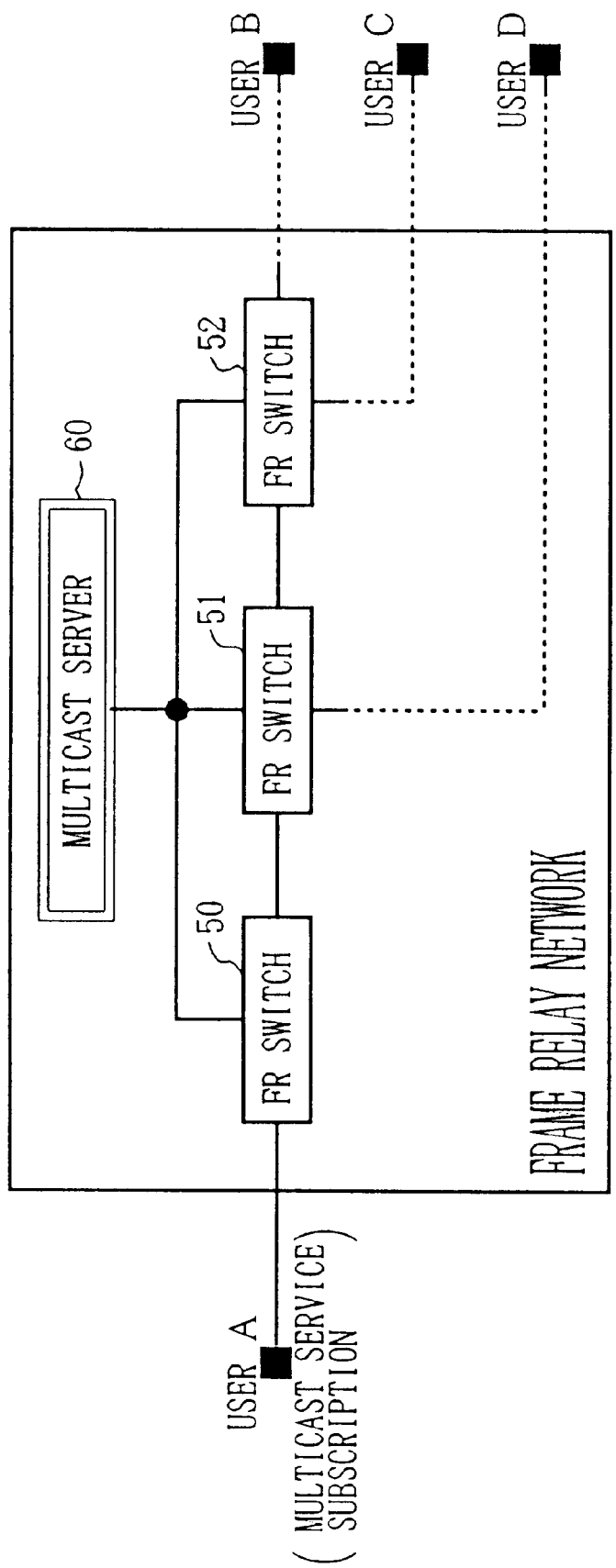
FIG. 2 shows a construction of a frame relay network to which the present invention is applied.

FIG. 2 shows an example of a construction of a frame relay network to which the present invention is applied. Referring to FIG. 2, user A is connected to a frame relay (FR) switch 50, users B and C are connected to a frame relay switch 52, and user D is connected to a frame relay switch 51. Each of the frame relay switches 50, 51 and 52 constitutes a frame relay network. Each of the frame relay switches is connected to a multicast server 60.

Figure 3:
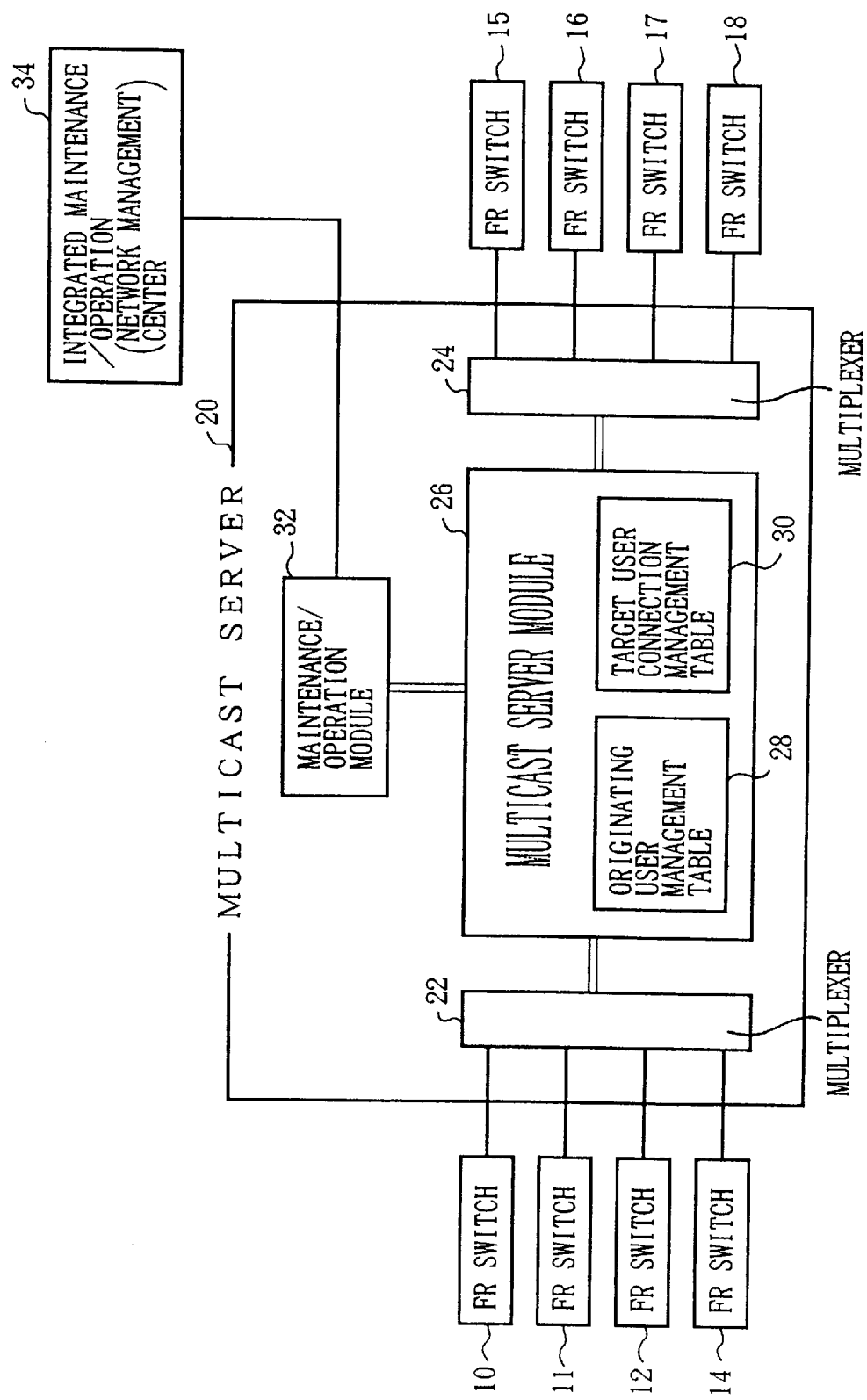
FIG. 3 is a block diagram of a multicast server according to the present invention.

FIG. 3 is a block diagram of a multicast server 20 according to the invention. Referring to FIG. 3, the multicast server 20 includes multiplexer devices 22 and 24, the multiplexer device 22 being connected to frame relay switches 10–14, and the multiplexer device 24 being connected to frame relay switches 15–18. Each of the frame relay switches 10–18 constitutes a frame relay network. The multiplexer devices 22 and 24 are connected to a multicast server module 26. The multicast server module 26 effects multicast management using a built-in originating user management table 28 (M1) and a target user connection management table 30 (M2). The originating user management table 28 and the target user connection management table 30 constitute user connection management means M0. The multicast server module 26 is connected to a maintenance and operation module 32 connected to an integrated maintenance and operation device 34 of a network management center.

Figure 4:
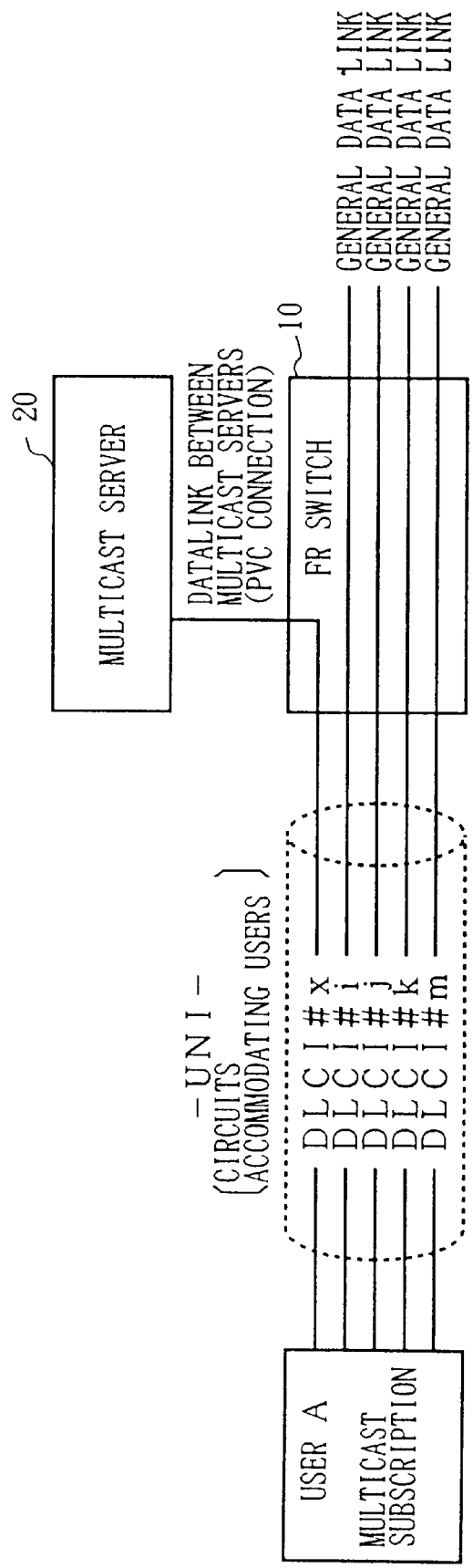
FIG. 4 shows a user network interface (UNI) in a frame relay network for a user subscribing to multicast service.

Users are given an option for multicast service when they subscribe to the network. As shown in FIG. 4, a user network interface (UNI) for a user subscribing to multicast service includes a connection DLCI (data link connection identifier) #x for use only in multicast communication. The DLCI #x is specified by a maintenance person so as to connect the user to the multicast server 20 by a permanent virtual circuit (PVC).

As shown in FIG. 5A, the originating user management table 28 lists circuit information comprising an originating LU (line number) and the DLCI, and a target user connection management table pointer for indicating the target user connection management table 30. The originating user management table 28 is searched for a combination of the originating LU and the DLCI. As shown in FIG. 5B, the target user connection management table 30 lists target addresses, and circuit information comprising the target LU and the DLCI. The target user connection management table 30 is searched for a target user connection management table pointer.

When a multicast service subscription occurs, the maintenance person establishes a permanent virtual circuit between the DLCI #x of the user and the LU+DLCI captured by the multicast server depending on the availability of the circuit and the accommodated position of the data link. The maintenance person then registers the captured LU+DLCI in the originating user management table 28 as an originating LU+DLCI. For control of multicast connection, a multicast connection control frame is used.

The user subscribing to the multicast service (first user) uses DLCIs #i–#m assigned to him or her for ordinary frame relay communication service, instead of the DLCI #x for multicast use only. In an ordinary frame relay communication, either PVC or SVC may be used. When the first user responds to a request for establishment of multicast connection from another (second) multicast user so that the first user becomes a multicast connection user, one of the DLCIs #i–#m should be available for SVC.

A user requesting establishment of a multicast connection for multicast communication sets a target address in a multicast connection registration request frame. A multicast connection registration request frame is one type of the multicast connection control frame. The user then sends the multicast connection registration request frame to the multicast server using the DLCI #x. Only one target address may be designated or a plurality of target addresses may be designated.

Figure 6:
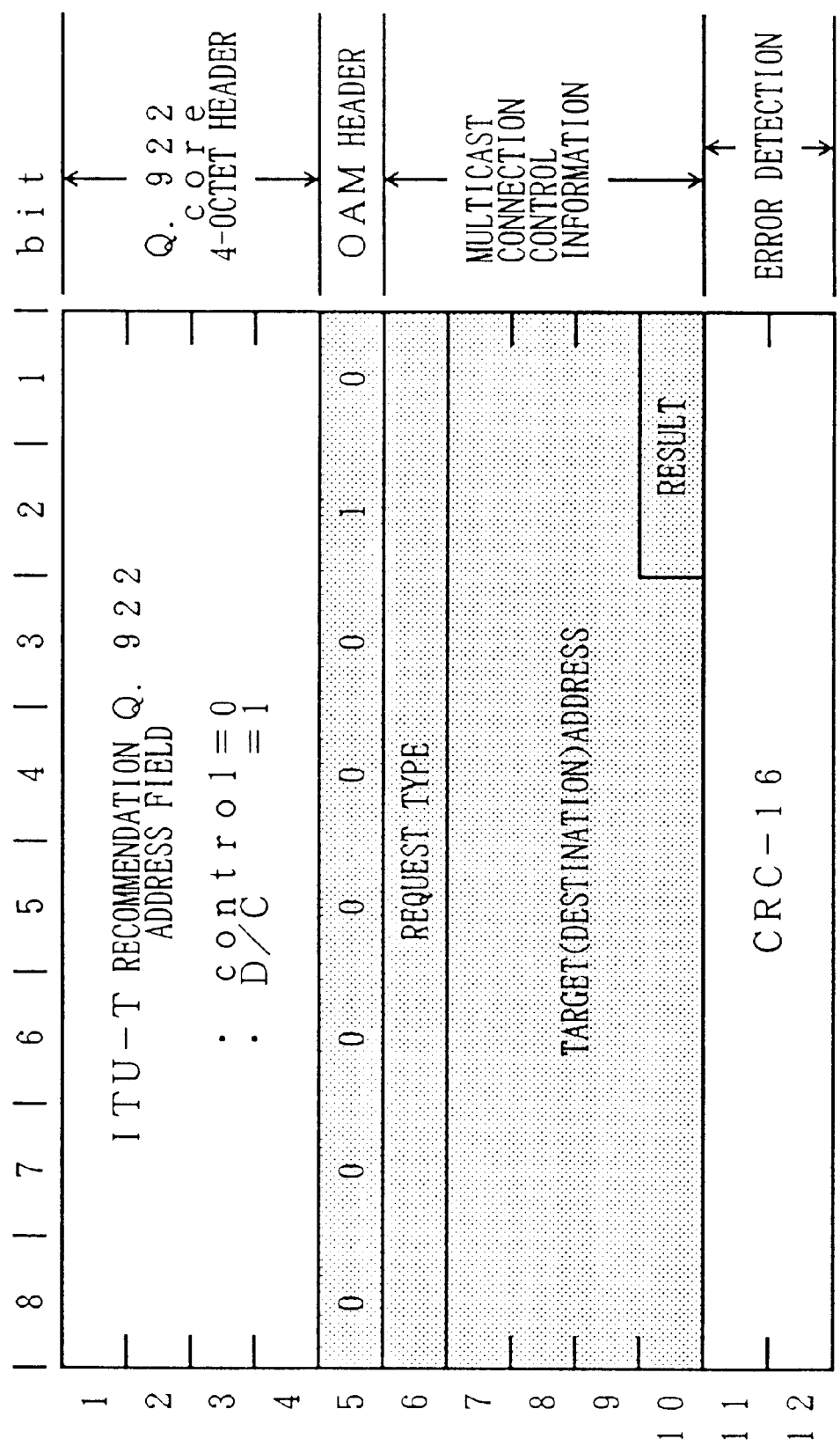
FIG. 6 shows a format of a multicast connection control frame in which a single target address is designated.

FIG. 6 shows a format of a multicast connection control frame in which a single target address is designated. Referring to FIG. 6, the four-octet header at the head of the frame is provided according to the ITU-T Recommendation Q.922. The fifth octet is an operation and management (OAM) header. For example, by designating "00000010" in the OAM header, multicast control is specified. The sixth octet indicates a type of request. "00000001" indicates a request for multicast connection registration, "00000010" indicates a response to the request for multicast connection registration, "00000011" indicates a request for cancellation of multicast connection, and "00000100" indicates a response to the request for cancellation of multicast connection. The sixth octet and the seventh—tenth octets constitute multicast connection control information. At a multicast connection registration requesting end, the target address is set in the seventh—tenth octets. In a responding end, first and second bits in the tenth octet are used to indicate a result of the request. "00" indicates a failure in setting the connection and "01" indicates a success in setting the connection. The eleventh and twelfth octets are used for error detection codes.

Figure 7:
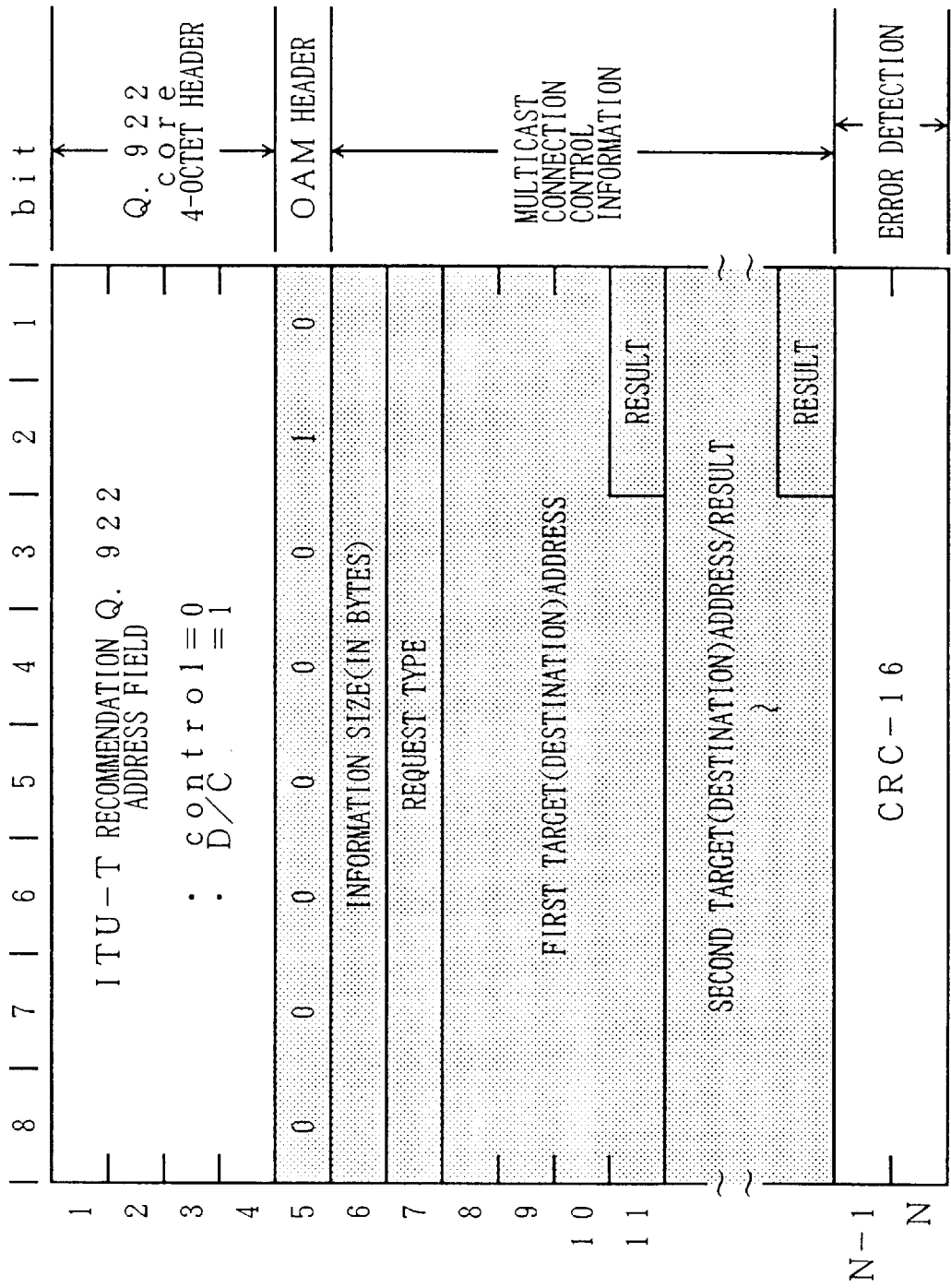
FIG. 7 shows a format of a multicast connection control frame in which a plurality of target addresses are designated.

FIG. 7 shows a format of a multicast connection control frame in which a plurality of target addresses are designated. The four-octet header at the head of the frame is provided according to the ITU-T Recommendation Q.922. The fifth octet is an operation and management (OAM) header. For example, "00000010" designates multicast control. The sixth octet indicates information size in bytes of the multicast connection control information. The seventh octet indicates a type of request. "00000001" indicates a request for multicast connection registration, "00000010" indicates a response to the request for multicast connection registration, "00000011" indicates a request for cancellation of multicast connection, and "00000100" indicates a response to the request for cancellation of multicast connection. The sixth octet and beyond constitute the multicast connection control information. At a multicast connection registration requesting end, a first target address is set in the seventh—tenth octets, a second target address is set in the twelfth —fifteenth octets, and so forth. In a responding end, first and second bits in the tenth octet are used to indicate a result of the request, first and second bits in the fifteenth octet are used to indicate a result of the request, and so forth. "00" indicates a failure in setting the connection and "01" indicates a success in setting the connection. The last two octets are used for error detection codes.

Figure 8:
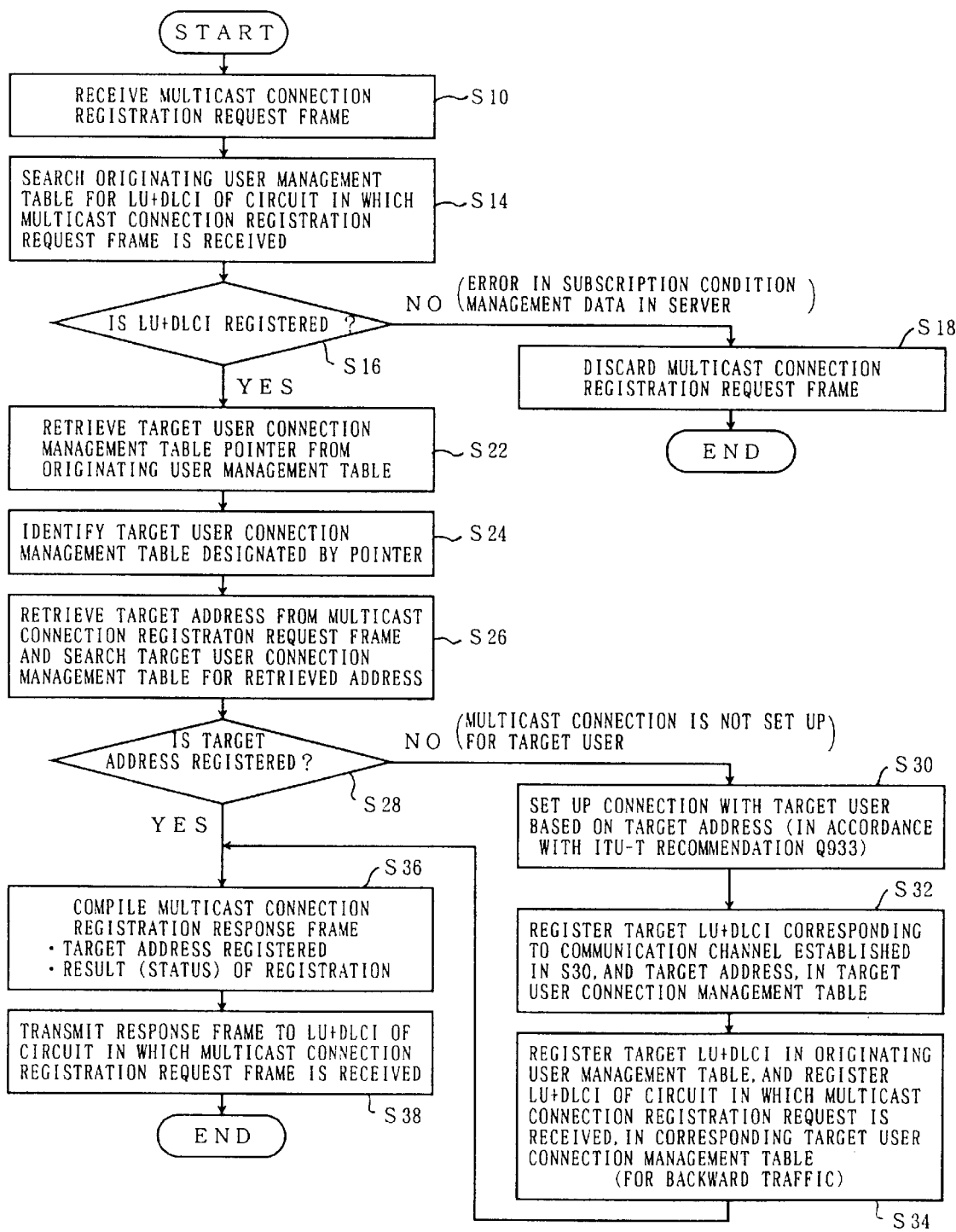
FIG. 8 is a flowchart of a process executed by the multicast server when a request for multicast connection registration occurs.

FIG. 8 is a flowchart of a process executed by the multicast server 20 (registration means M3) when a request for multicast connection registration occurs. Referring to FIG. 8, the multicast server 20 receives a request for multicast connection registration in step S10. In step S14, the originating user management table 28 is searched for the LU+DLCI of a circuit in which the frame is received. In S16, a determination is given as to whether the originating user management table registers the LU+DLCI.

If the LU+DLCI is not registered, the multicast connection registration request frame is disrcarded in step S18 and the process is terminated. If the LU+DLCI is registered, the target user connection management table pointer corresponding to the registered LU+DLCI is retrieved in step S22. In step S24, the target user connection management table 30 designated by the target user connection management table pointer is identified. In step S26, the target address is retrieved from the multicast connection registration request frame. The target user connection management table 30 is searched for the retrieved target address. In step S28, a determination is made as to whether the target address is registered in the target user connection management table 30.

If the target address is not registered, connection with the target user is registered in step S30 in accordance with the SVC set up procedure complying with the ITU-T Recommendation Q.933. The target user should be subscribing to a DLCI in order to use the SVC service. In step S32, a target LU+DLCI corresponding to the SVC of the target user is registered in the target user connection management table 30 in such a manner as to relate the LU+DLCI to the target address. In step S34, the LU+DLCI is registered in the originating user management table 28 as the originating LU+DLCI and registers the LU+DLCI of a circuit in which the multicast connection registration request is received, in the corresponding target user connection management table 30. Step 34 is needed to transfer backward traffic. If the multicast connection registration request frame has the format as shown in FIG. 7, steps S26–S34 are repeated as many times as the number of target addresses.

If it is determined in step S28 that the target address is registered, or when step S34 is completed, control is turned to step S36, where a multicast connection registration response frame for reporting the registered target address and the result (status) of registration. In step S38, the frame compiled in step S36 is transmitted to the LC+DLCI in which the multicast connection registration request frame is received. The process is then terminated.

A subscribing user requesting an addition of multicast connection transmits a multicast connection registration request frame, in which a target user address is set, using the DLCI #x, whereupon the multicast server 20 executes a process shown in FIG. 8.

The user transmitting the multicast connection registration request learns that the connection is established when the multicast connection registration response is received. When the multicast connection registration is successful, the user DLCI #x is exclusively used for multicast connection for a multicast user group most recently requesting the registration. The subscribing user transmits a user data frame to the DLCI #x.

Figure 9:
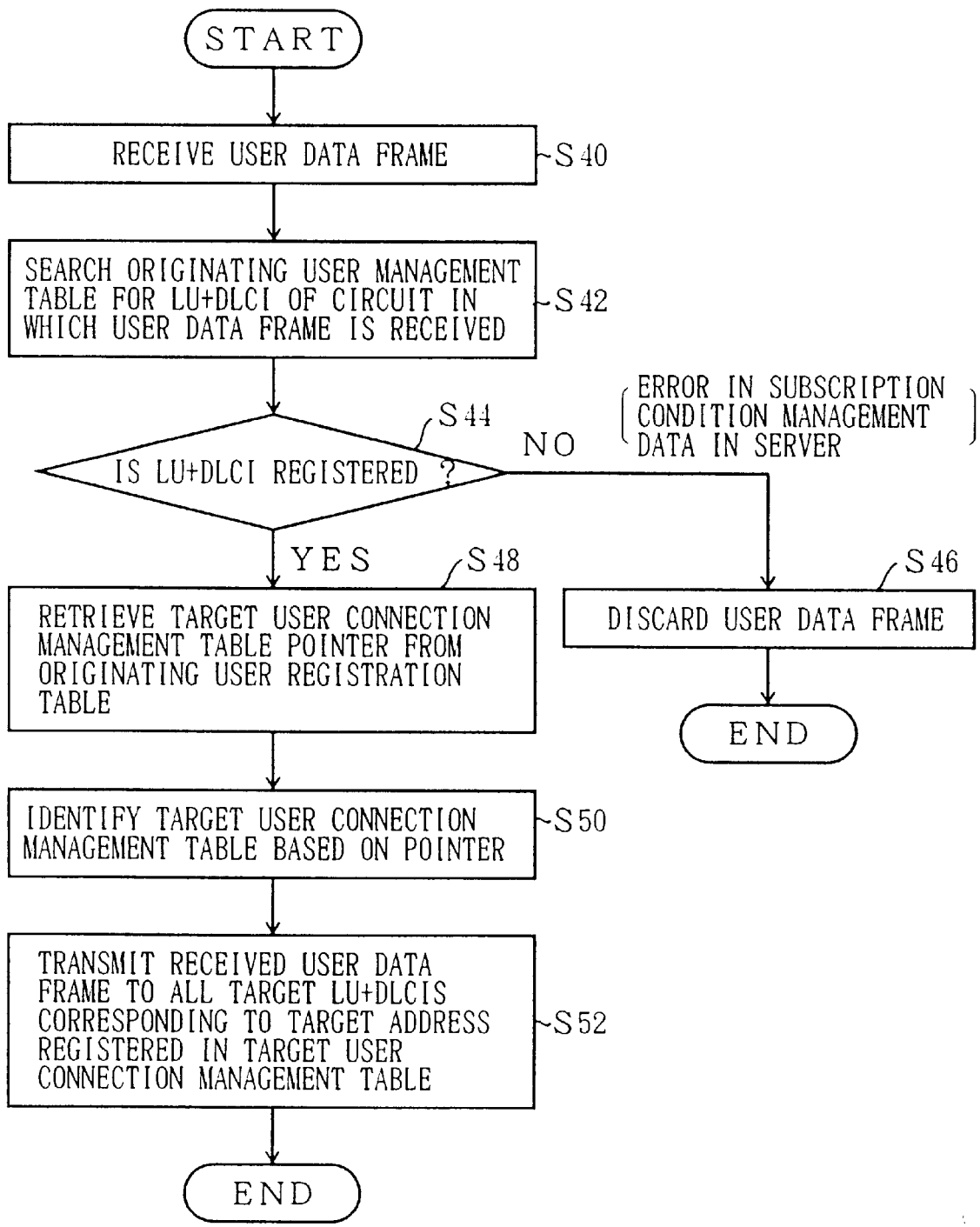
FIG. 9 is a flowchart of a process executed by the multicast server when the multicast server receives a user frame from a multicast user.

FIG. 9 is a flowchart of a process executed by the multicast server 20 (transmission means M4) when the multicast server 20 receives a user frame from a multicast user. Referring to FIG. 9, the multicast server 20 receives a user frame in step S40. In step S42, the multicast server 20 searches the originating user management table 28 for the LU+DLCI of a circuit in which the user frame is received. In step S44, a determination is made as to whether the LU+DLCI is registered.

If the LU+DLCI is not registered, the user frame received is discarded in step S46, and the process is terminated. If the LU+DLCI is registered, the target user connection management table pointer is retrieved in step S48. In step S50, the target user connection management table 30 is identified based on the pointer. In step S52, the received user data frame is transmitted to all the target LU+DLCIs corresponding to the target address registered in the target user connection management table 30. The process is then terminated.

Figure 10:
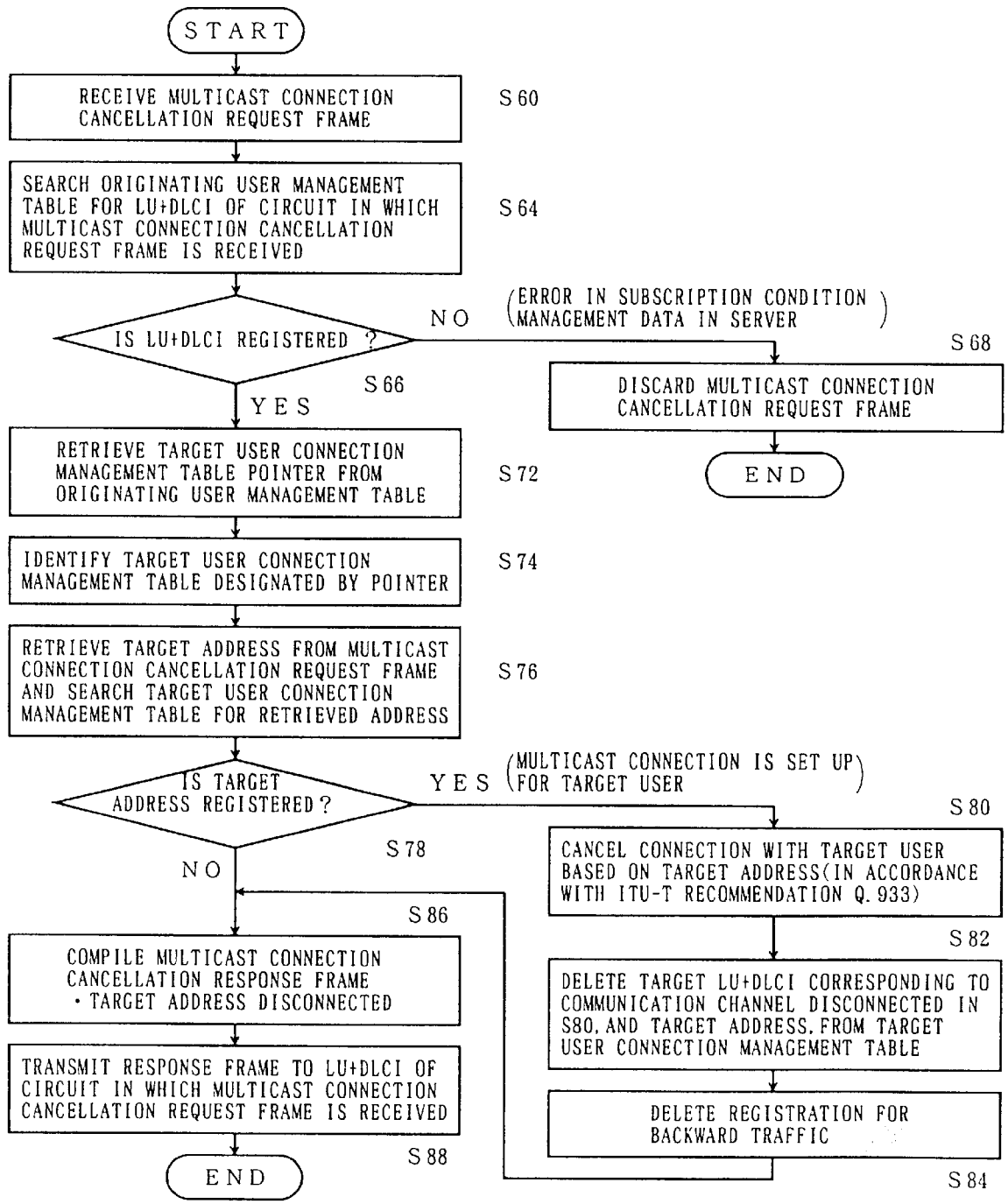
FIG. 10 is a flowchart of a process executed by the multicast server when a request for cancellation of multicast connection occurs.

FIG. 10 is a flowchart of a process executed by the multicast server 20 (registration deletion means M5) when a request for cancellation of multicast connection occurs. Referring to FIG. 9, the multicast server 20 receives a multicast connection cancellation request frame in step S60. In step S64, the multicast server 20 searches the originating user management table 28 for the LU+DLCI of a circuit in which the frame is received. In step S66, a determination is made as to whether the LU+DLCI is registered.

If the LU+DLCI is not registered, the multicast connection cancellation request frame received is discarded in step S68, whereupon the process is terminated. If the LU+DLCI is registered, the target user connection management table pointer is retrieved in step S72. In step S74, the target user connection management table 30 is identified based on the pointer. In step S76, the target address is retrieved from the multicast connection cancellation request frame. The target user connection management table 30 is searched for the target address. In step S78, a determination is made as to whether the target address is registered.

If the target address is registered, connection is canceled for the target user in step S80. In cancellation of connection, the SVC disconnection procedure complying with the ITU-T Recommendation Q.933 is used. In step S82, the target address and the target LU+DLCI corresponding to a communication channel disconnected as a result of step S80 are deleted from the target user connection management table 30. In step S84, the originating LU +DLCI for backward traffic is deleted from the originating user management table 28. The LU+DLCI in the corresponding target user connection management table 30 is deleted. If the multicast connection cancellation request frame has a format shown in FIG. 7, steps S76–S84 are repeated as many times as the number of target addresses.

When it is determined in step S78 that the target address is not registered, or when step S84 is terminated, control is turned to step S86, where a multicast connection cancellation response frame for reporting the target address removed from registration is compiled. According to the present invention, when the target address requested by the cancellation request to be removed from registration is found to be already removed from registration (NO in step S78), the server determines that the disconnection process has been completed properly and sends a multicast connection cancellation response in which that address is set to the relevant circuit. Thus, in step S88, the response frame compiled in step S86 is transmitted to the LC+DLCI of a circuit in which the multicast connection cancellation request frame is received, whereupon the process is terminated.

Figure 11:
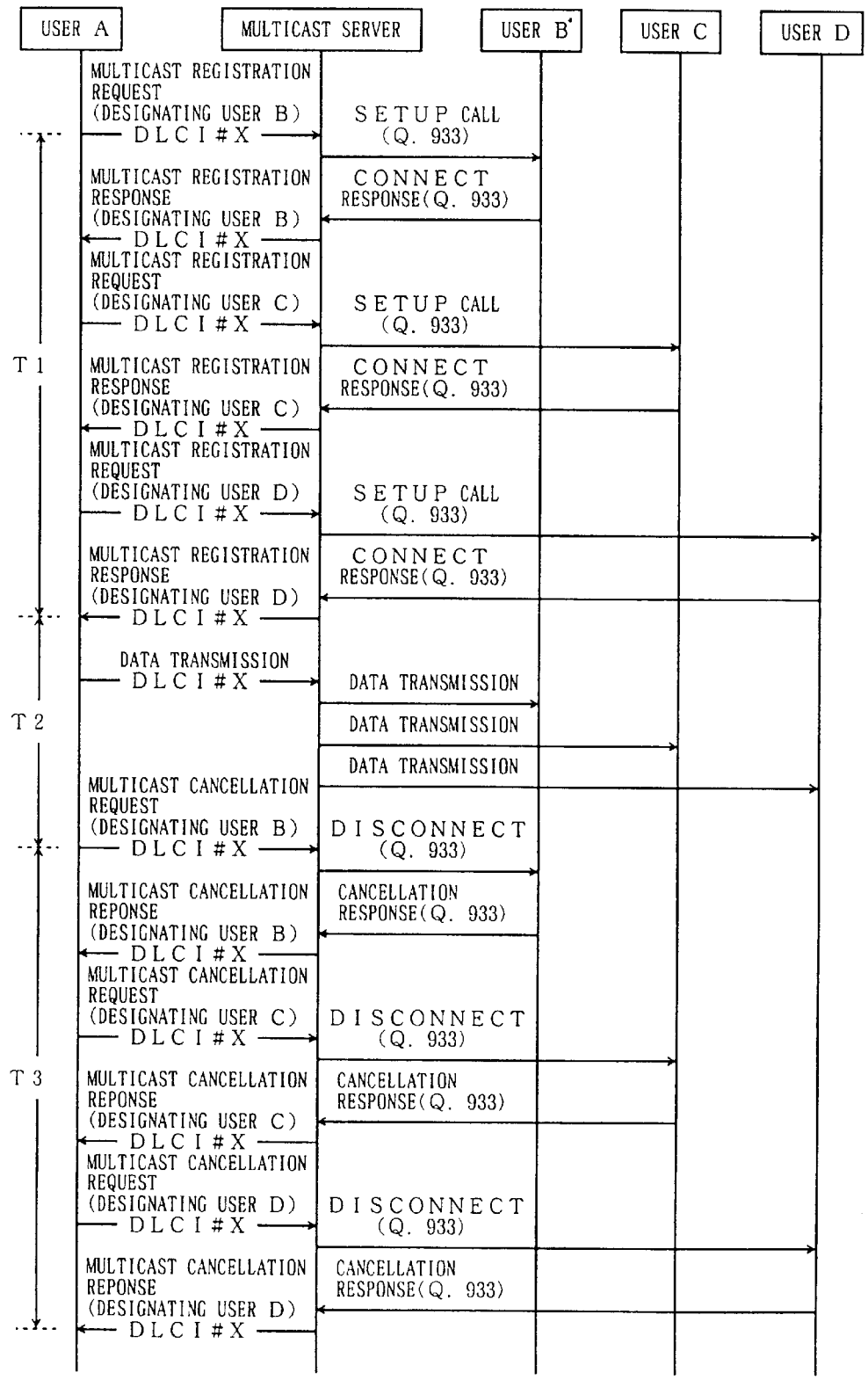
FIG. 11 shows a sequence of multicast registration cancellation in which a single target address is designated.

FIG. 11 shows a sequence of multicast registration cancellation in which a single target address is designated. Referring to FIG. 11, multicast connection registration is performed in period T1 according to the flowchart of FIG. 8. In period T2, multicast transmission of user data frame is performed according to the flowchart of FIG. 9. In period T3, multicast connection is canceled according to the flowchart of FIG. 10.

Figure 12:
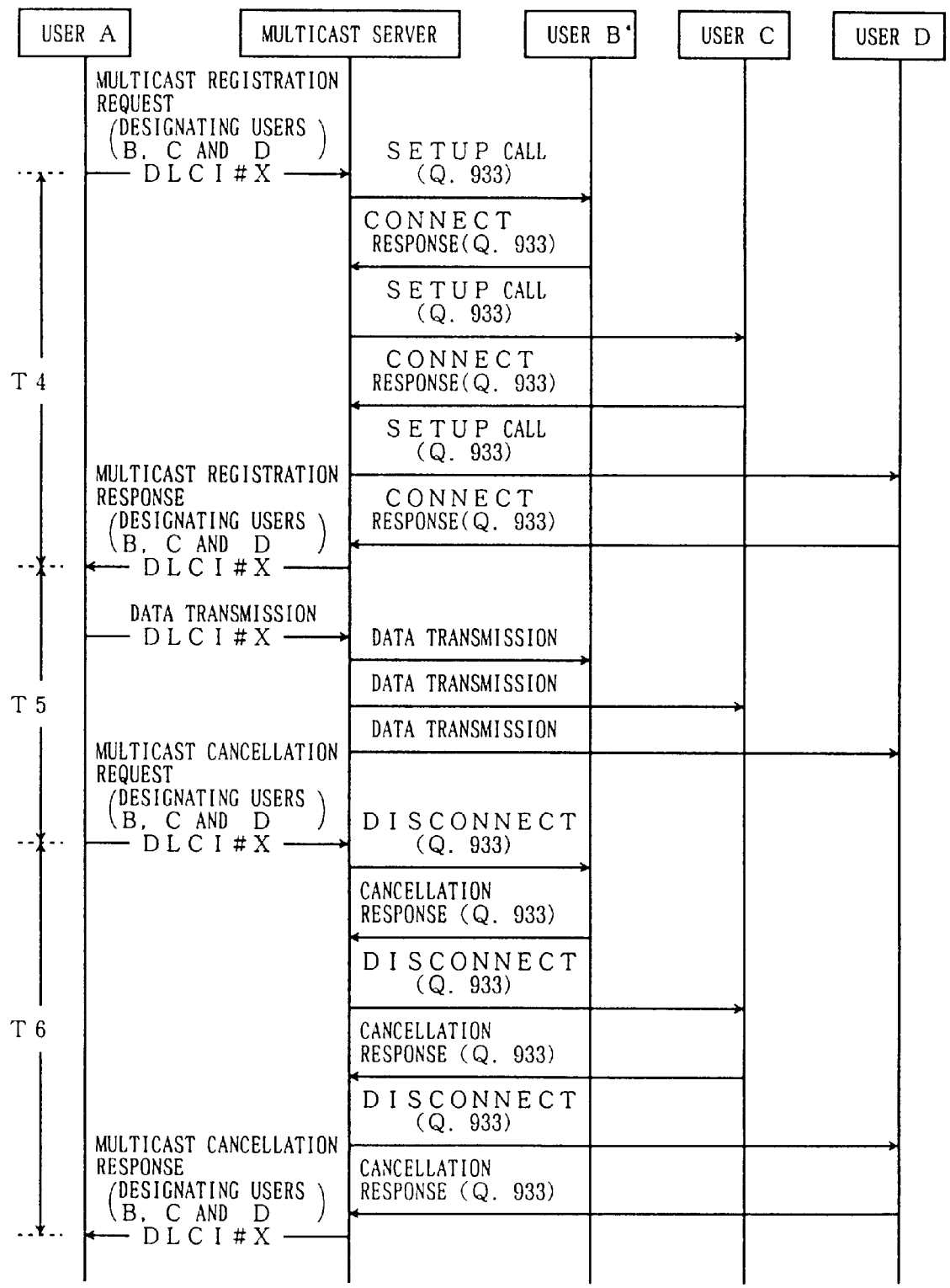
FIG. 12 shows a sequence of multicast registration cancellation in which a plurality of target addresses are designated.

FIG. 12 shows a sequence of multicast registration cancellation in which a plurality of target addresses are designated. Referring to FIG. 12, multicast connection registration is performed in period T4 according to the flowchart of FIG. 8. In period T5, multicast transmission of user data is performed according to the flowchart of FIG. 9. In period T6, cancellation of multicast connection is performed according to the flowchart of FIG. 10.

Figure 13:
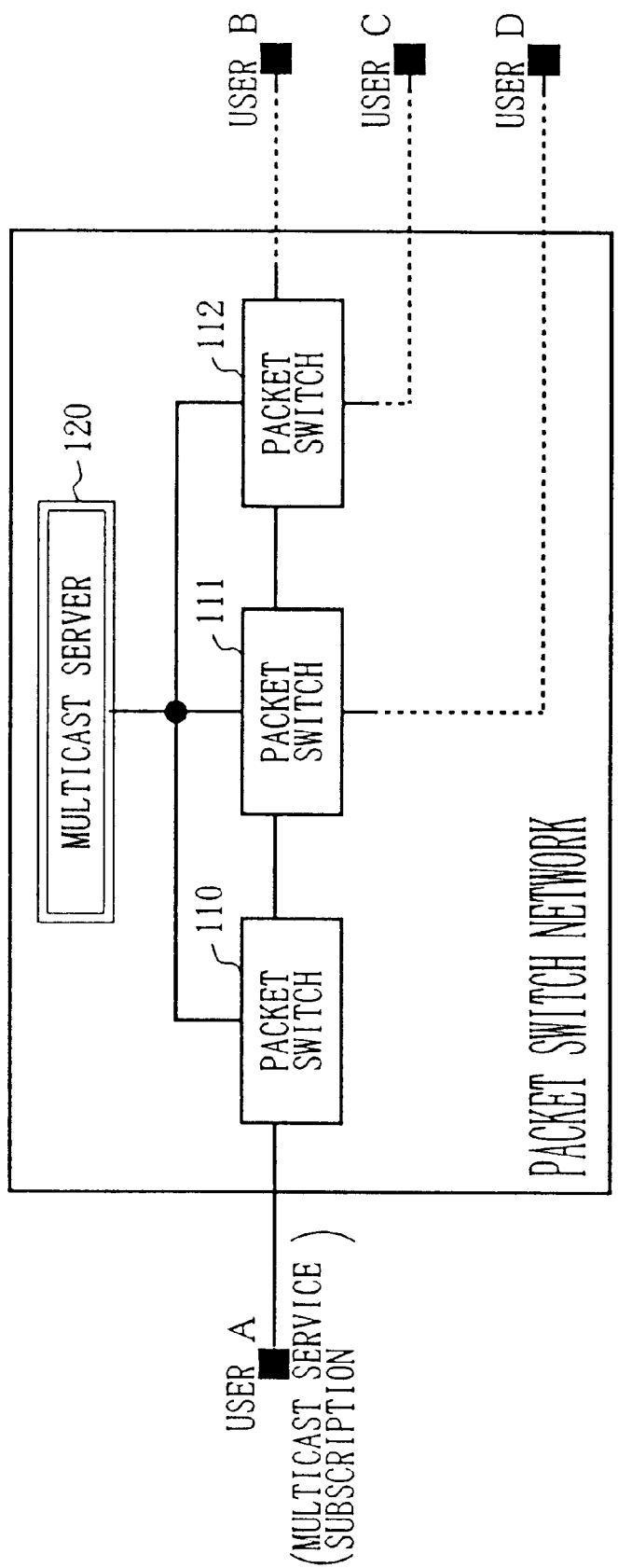
FIG. 13 shows a construction of a packet switching network to which the present invention is applied.

FIG. 13 shows a construction of a packet switching network to which the present invention is applied. Referring to FIG. 13, user A is connected to a packet switch 110, users B and C are connected to a packet switch 112, and user D is connected to a packet switch 111. Each of the packet switches 110, 111 and 112 constitutes a packet switch network and is connected to a multicast server 120.

Figure 14:
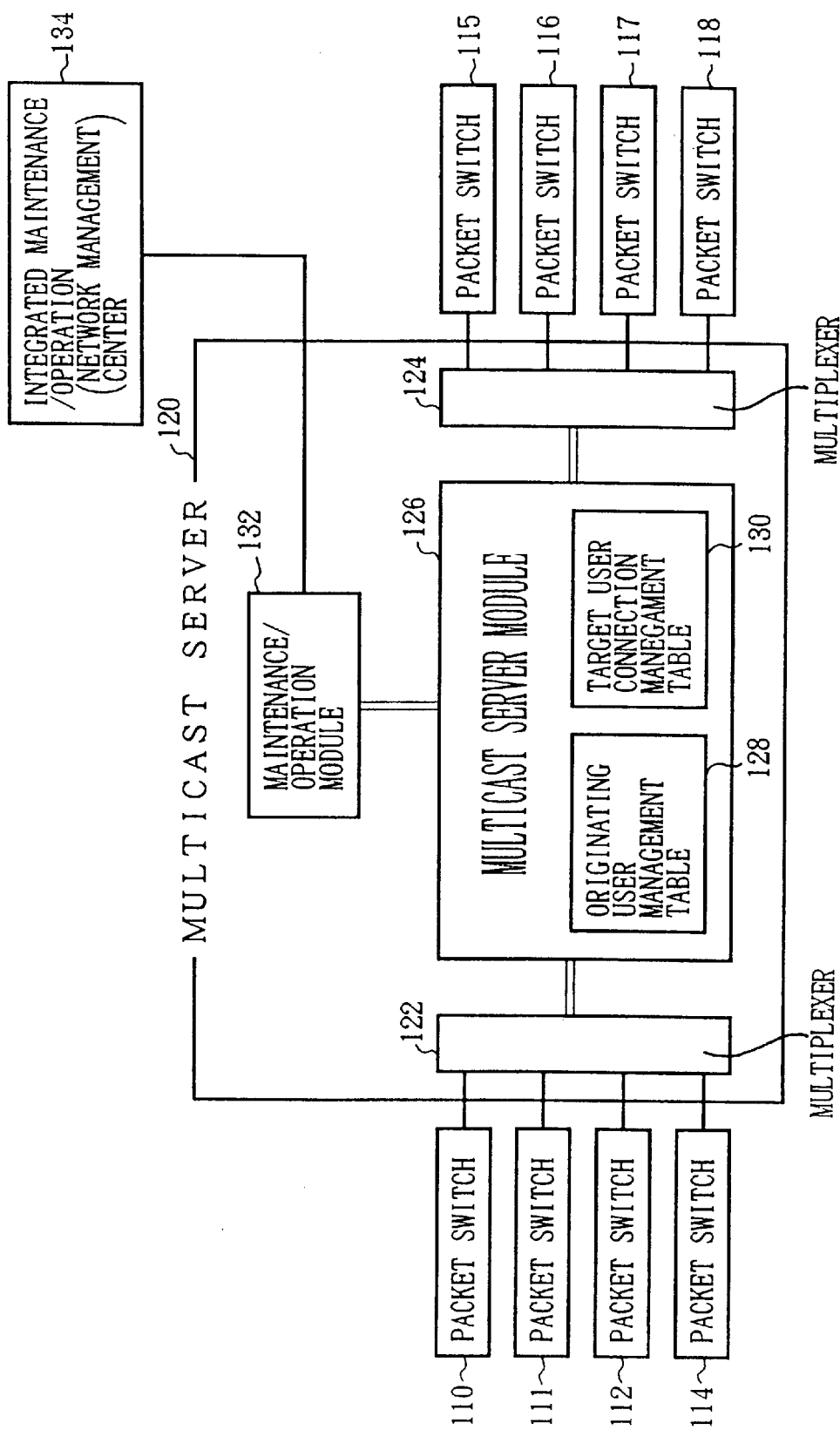
FIG. 14 is a block diagram of a multicast server according to the present invention.

FIG. 14 is a block diagram showing a construction of the multicast server 120. Referring to FIG. 14, the multicast server 120 includes multiplexer devices 122 and 124, the multiplexer device 122 being connected to packet switches 110–114, and the multiplexer device 124 being connected to packet switches 115–118. Each of the packet switches 110–118 constitutes a packet switch network. The multiplexer devices 122 and 124 are connected to a multicast server module 126. The multicast server module 126 effects multicast management using a built-in originating user management table 128 (M1) and a target user connection management table 130 (M2). The multicast server module 126 is connected to a maintenance and operation module 132 connected to an integrated maintenance and operation device 134 of a network management center.

Figure 15:
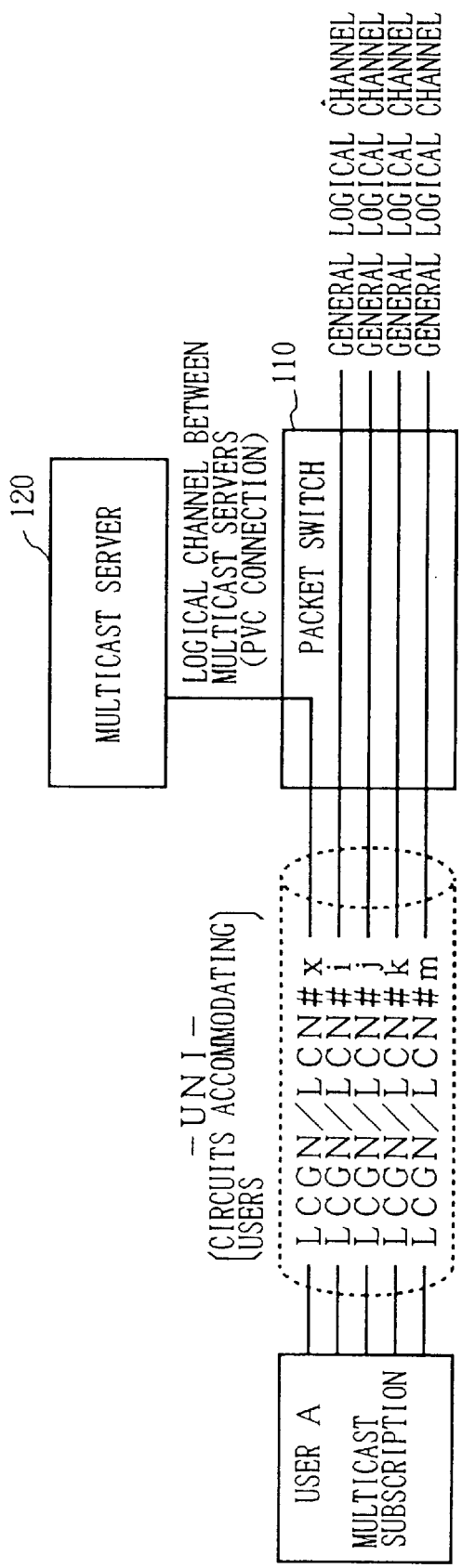
FIG. 15 shows a user network interface (UNI) in a packet network for a user subscribing to multicast service.

Users are given an option for multicast service when they subscribe to the network. As shown in FIG. 15, a user network interface (UNI) for a user subscribing to multicast service includes a connection LCGN/LCN (logical channel number) #x for use only in multicast communication. The LCGN/LCN #x is specified by a maintenance person so as to connect the user to the multicast server 120 by a permanent virtual circuit (PVC).

Figure 16A:
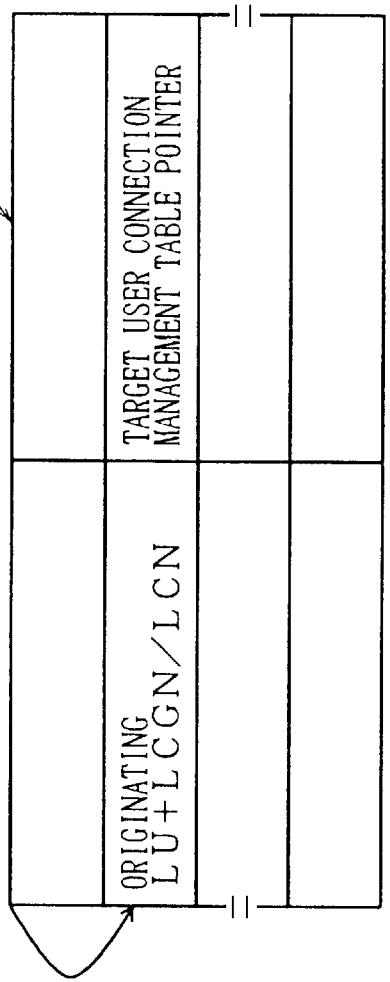
FIG. 16A shows an originating user management table.
Figure 16B:
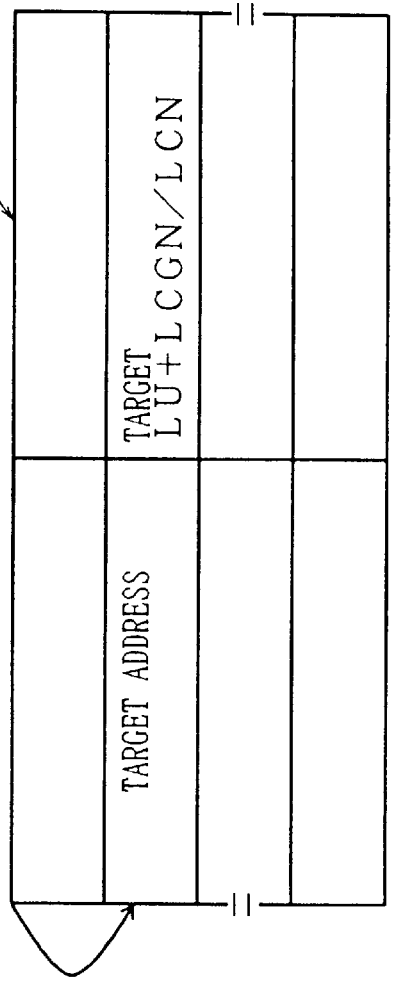
FIG. 16B shows a target user connection management table.

As shown in FIG. 16A, the originating user management table 12B lists circuit information comprising an originating LU (line number) and the LCGN/LCN, and a target user connection management table pointer for indicating the target user connection management table 130. The originating user management table 128 is searched for a combination of the originating LU and the LCGN/LCN. As shown in FIG. 16B, the target user connection management table 130 lists target addresses, and circuit information comprising the target LU and the LCGN/LCN. The target user connection management table 130 is searched for a target user connection management table pointer.

When a multicast service subscription occurs, the maintenance person establishes a permanent virtual circuit between the LCGN/LCN #x of the user and the LU+LCGN/LCN captured by the multicast server depending on the availability of the circuit and the accommodated position of the data link. The maintenance person then registers the captured LU+LCGN/LCN in the originating user management table 128 as an originating LU+LCGN/LCN.

The user subscribing to the multicast service (first user) uses LCGN/LCNs #i–#m assigned to him or her for ordinary packet communication service, instead of the LCGN/LCN #x for multicast use only. In an ordinary packet communication, either PVC or SVC may be used. When the first user responds to a request for establishment of multicast connection from another (second) multicast user so that the first user becomes a multicast connection user, one of the LCGN/LCNs #i–#m should be available for SVC.

A user requesting establishment of a multicast connection for multicast communication sets a target address in a multicast connection registration request packet. The user then sends the multicast connection registration request packet to the multicast server using the LCGN/LCN #x. Only one target address may be designated or a plurality of target addresses may be designated.

Figure 17:
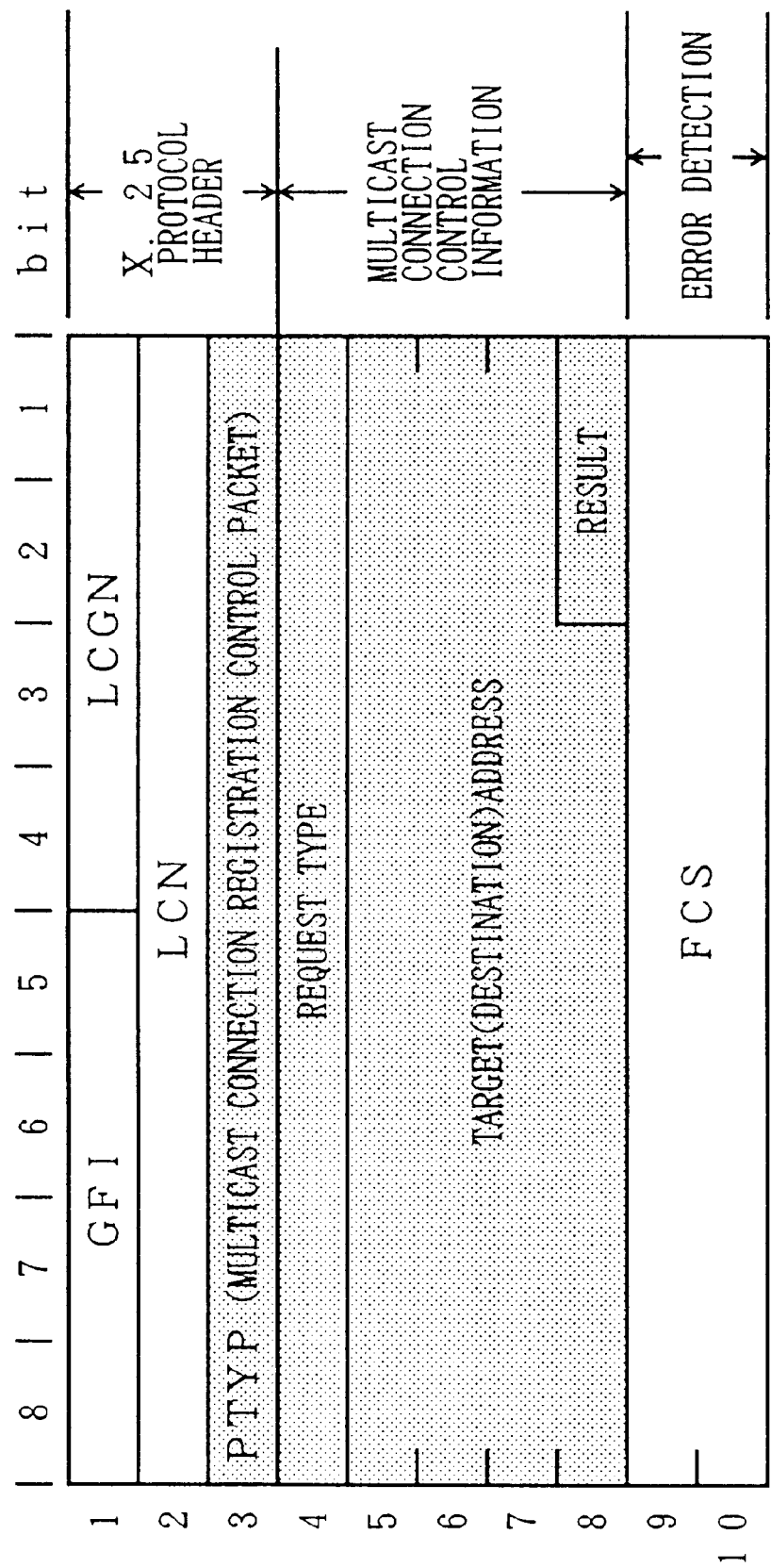
FIG. 17 shows a format of a multicast connection control packet in which a single target user is designated.

FIG. 17 shows a format of a multicast connection control packet in which a single target address is designated. Referring to FIG. 17, the three-octet header at the head of the packet is provided according to the X.25 protocol. The third octet indicates a packet type (PTYP) and indicates that the packet is a multicast connection control packet according to a definition established according to the present invention. The fourth octet indicates a type of request. "00000001" indicates a request for multicast connection registration, "00000010" indicates a response to the request for multicast connection registration, "00000011" indicates a request for cancellation of multicast connection, and "00000100" indicates a response to the request for cancellation of multicast connection. The fourth octet and the fifth—eighth octets constitute multicast connection control information. At a multicast connection registration requesting end, the target address is set in the fifth—eighth octets. In a responding end, first and second bits in the eighth octet are used to indicate a result of the request. "00" indicates a failure in setting the connection and "01" indicates a success in setting the connection. The ninth and tenth octets are used for error detection codes FCS.

Figure 18:
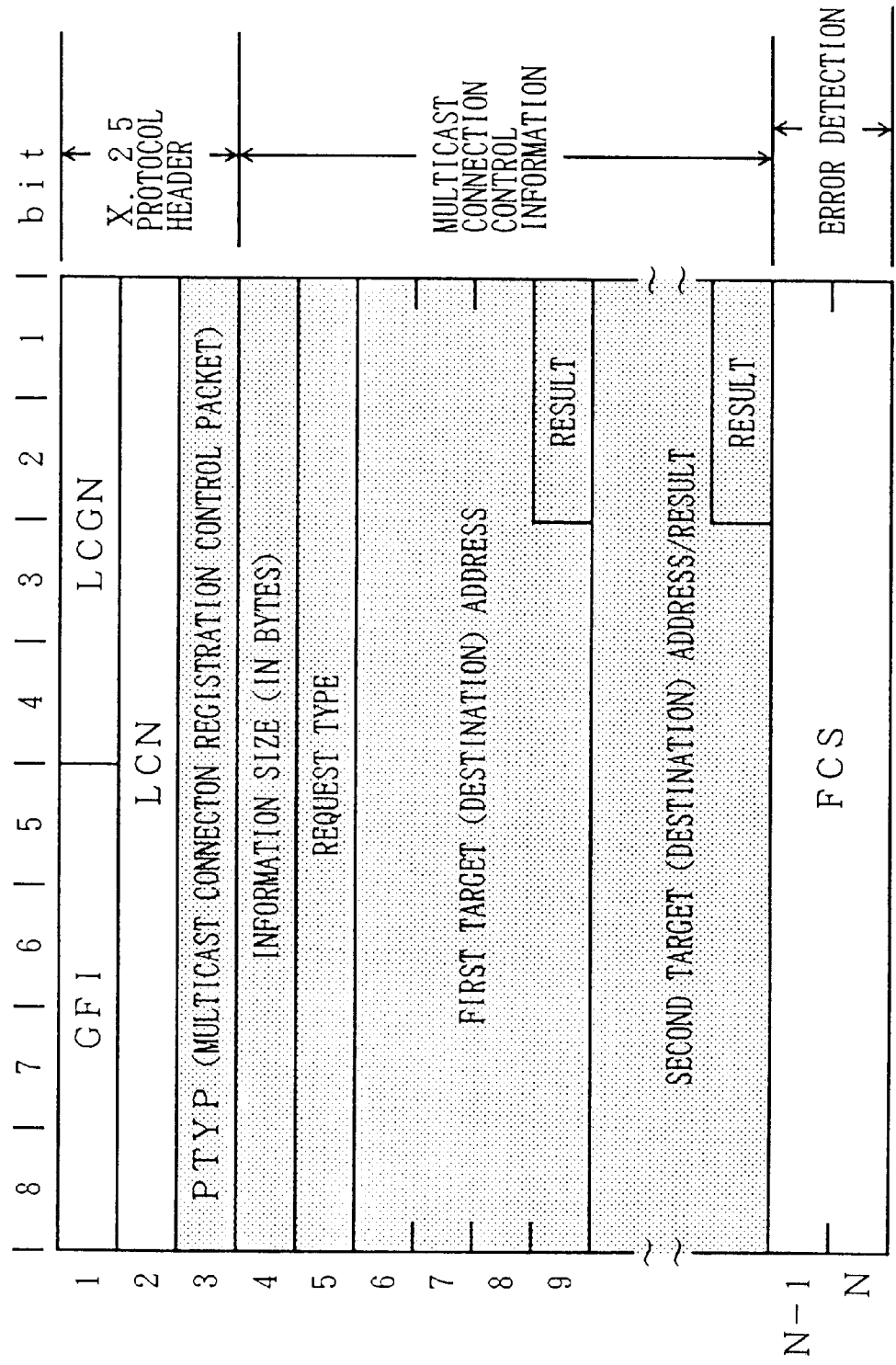
FIG. 18 shows a format of a multicast connection control packet in which a plurality of target users are designated.

FIG. 18 shows a format of a multicast connection control packet in which a plurality of target addresses are designated. The three-octet header at the head of the packet is provided according to the X.25 protocol. The third octet indicates a packet type (PTYP) and indicates that the packet is a multicast connection control packet according to a definition established in the present invention. For example, "00000010" designates multicast control. The fourth octet indicates information size in bytes of the multicast connection control information. The fifth octet indicates a type of request. "00000001" indicates a request for multicast connection registration, "00000010" indicates a response to the request for multicast connection registration, "00000011" indicates a request for cancellation of multicast connection, and "00000100" indicates a response to the request for cancellation of multicast connection. The fifth octet and beyond constitute the multicast connection control information. At a multicast connection registration requesting end, a first target address is set in the sixth—ninth octets, a second target address is set in the tenth—thirteenth octets, and so forth. In a responding end, first and second bits in the ninth octet are used to indicate a result of the request, first and second bits in the thirteenth octet are used to indicate a result of the request, and so forth. "00" indicates a failure in setting the connection and "01" indicates a success in setting the connection. The last two octets are used for error detection codes FCS.

Figure 19:
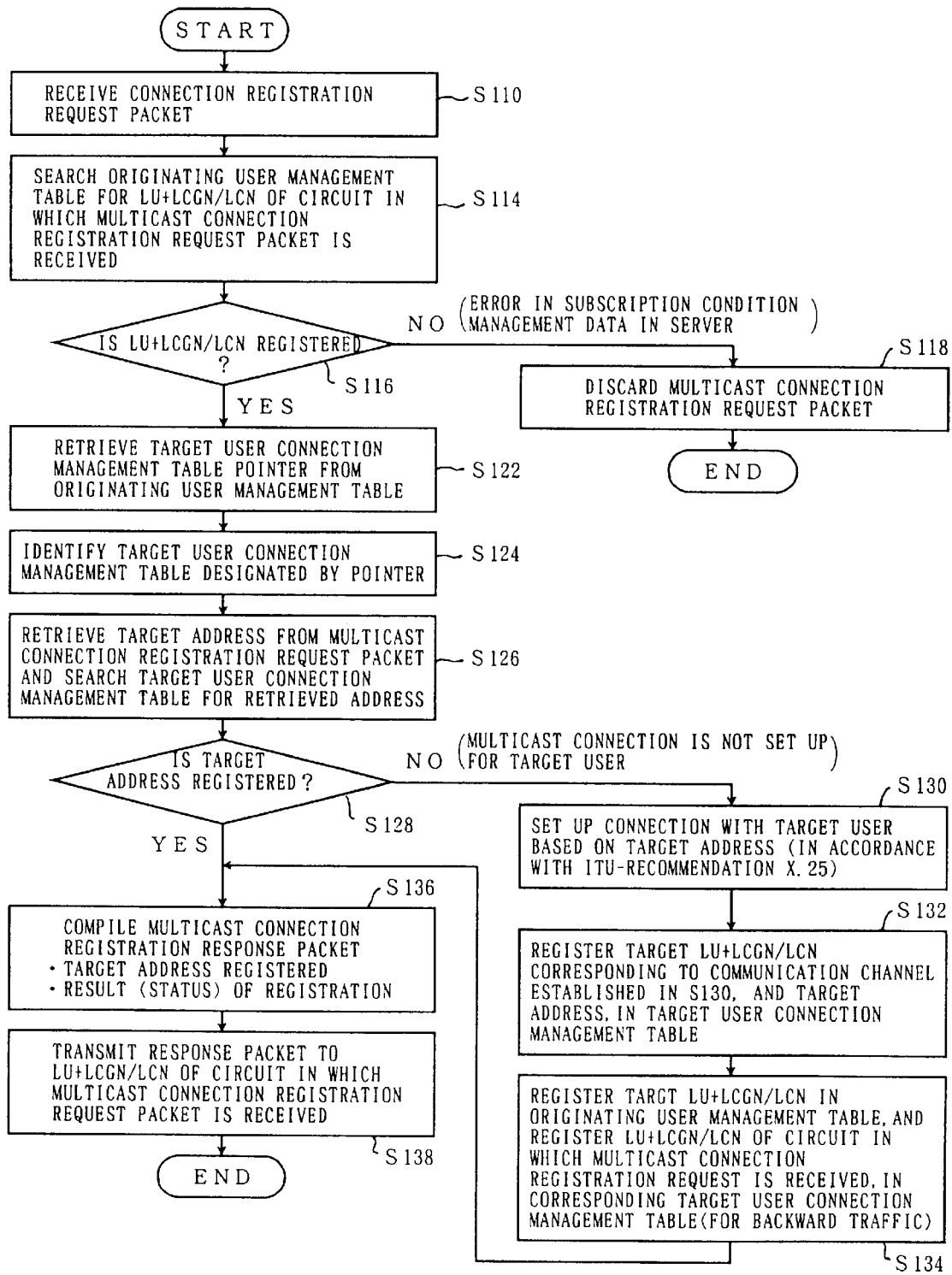
FIG. 19 is a flowchart of a process executed by the multicast server when a request for multicast connection registration occurs.

FIG. 19 is a flowchart of a process executed by the multicast server 120 (registration means M3) when a request for multicast connection registration occurs. Referring to FIG. 19, the multicast server 120 receives a request for multicast connection registration in step S110. In step S114, the originating user management table 128 is searched for the LU+LCGN/LCN of a circuit in which the packet is received. In S116, a determination is given as to whether the originating user management table 128 registers the LU+LCGN/LCN.

If the LU+LCGN/LCN is not registered, the multicast connection registration request packet is discarded in step S118 and the process is terminated. If the LU+LCGN/LCN is registered, the target user connection management table pointer corresponding to the registered LU+LCGN/LCN is retrieved in step S122. In step S124, the target user connection management table 130 designated by the target user connection management table pointer is identified. In step S126, the target address is retrieved from the multicast connection registration request packet. The target user connection management table 130 is searched for the retrieved target address. In step S128, a determination is made as to whether the target address is registered in the target user connection management table 130.

If the target address is not registered, connection with the target user is registered in step S130 in accordance with the SVC set up procedure complying with the ITU-T Recommendation X.25. The target user should be subscribing to an LCGN/LCN in order to use the SVC service. In step S132, a target LU+LCGN/LCN corresponding to the SVC of the target user is registered in the target user connection management table 130 in such a manner as to relate the LU+LCGN/LCN to the target address. In step S134, the LU+LCGN/LCN is registered in the originating user management table 128 as the originating LU+LCGN/LCN and registers the LU+LCGN/LCN of a circuit in which the multicast connection registration request is received, in the corresponding target user connection management table 130. Step 134 is needed to transfer backward traffic. If the multicast connection registration request packet has the format as shown in FIG. 18, steps S126–S134 are repeated as many times as the number of target addresses.

If it is determined in step S128 that the target address is registered, or when step S134 is completed, control is turned to step S136, where a multicast connection registration response packet for reporting the registered target address and the result (status) of registration. In step S138, the packet compiled in step S136 is transmitted to the LC+LCGN/LCN in which the multicast connection registration request packet is received. The process is then terminated.

A subscribing user requesting an addition of multicast connection transmits a multicast connection registration request packet, in which a target user address is set, using the LCGN/LCN #x, whereupon the multicast server 120 executes a process shown in FIG. 19.

The user transmitting the multicast connection registration request learns that the connection is established when the multicast connection registration response is received. When the multicast connection registration is successful, the user LCGN/LCN #x is exclusively used for multicast connection for a multicast user group most recently requesting the registration. The subscribing user transmits user data packet to the LCGN/LCN #x.

Figure 20:
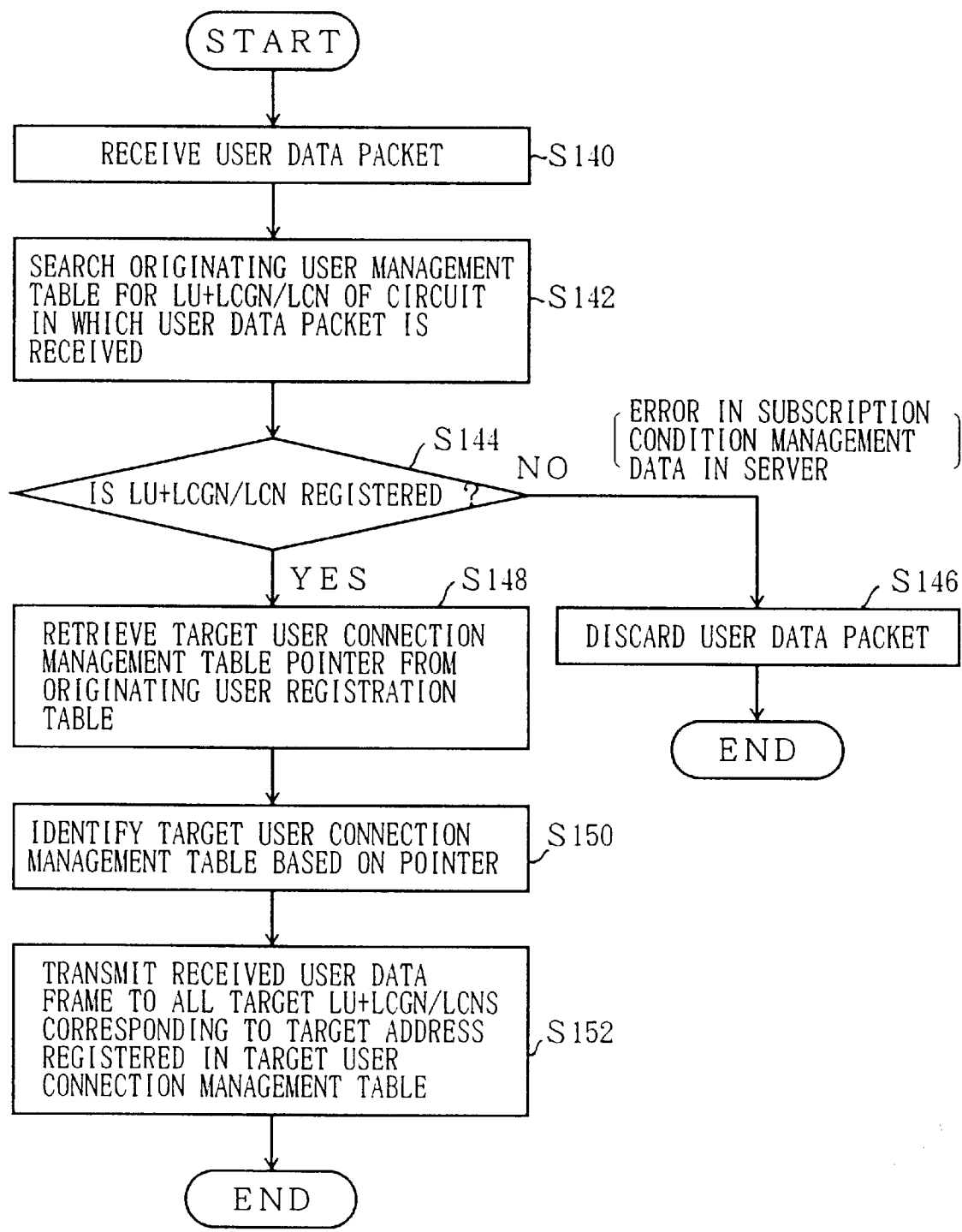
FIG. 20 is a flowchart of a process executed by the multicast server when the multicast server receives a user packet to be transmitted using a multicast connection.

FIG. 20 is a flowchart of a process executed by the multicast server 120 (transmission means M4) when the multicast server 120 receives a user packet to be transmitted using a multicast connection. Referring to FIG. 20, the multicast server 120 receives a user packet in step S140. In step S142, the multicast server 120 searches the originating user management table 128 for the LU+LCGN/LCN of a circuit in which the user packet is received. In step S144, a determination is made as to whether the LU+LCGN/LCN is registered.

If the LU+LCGN/LCN is not registered, the user packet received is discarded in step S146, and the process is terminated. If the LU+LCGN/LCN is registered, the target user connection management table pointer is retrieved in step S148. In step S150, the target user connection management table 130 is identified based on the pointer. In step S152, the received user data packet is transmitted to all the target LU+LCGN/LCNs corresponding to the target address registered in the target user connection management table 130. The process is then terminated.

Figure 21:
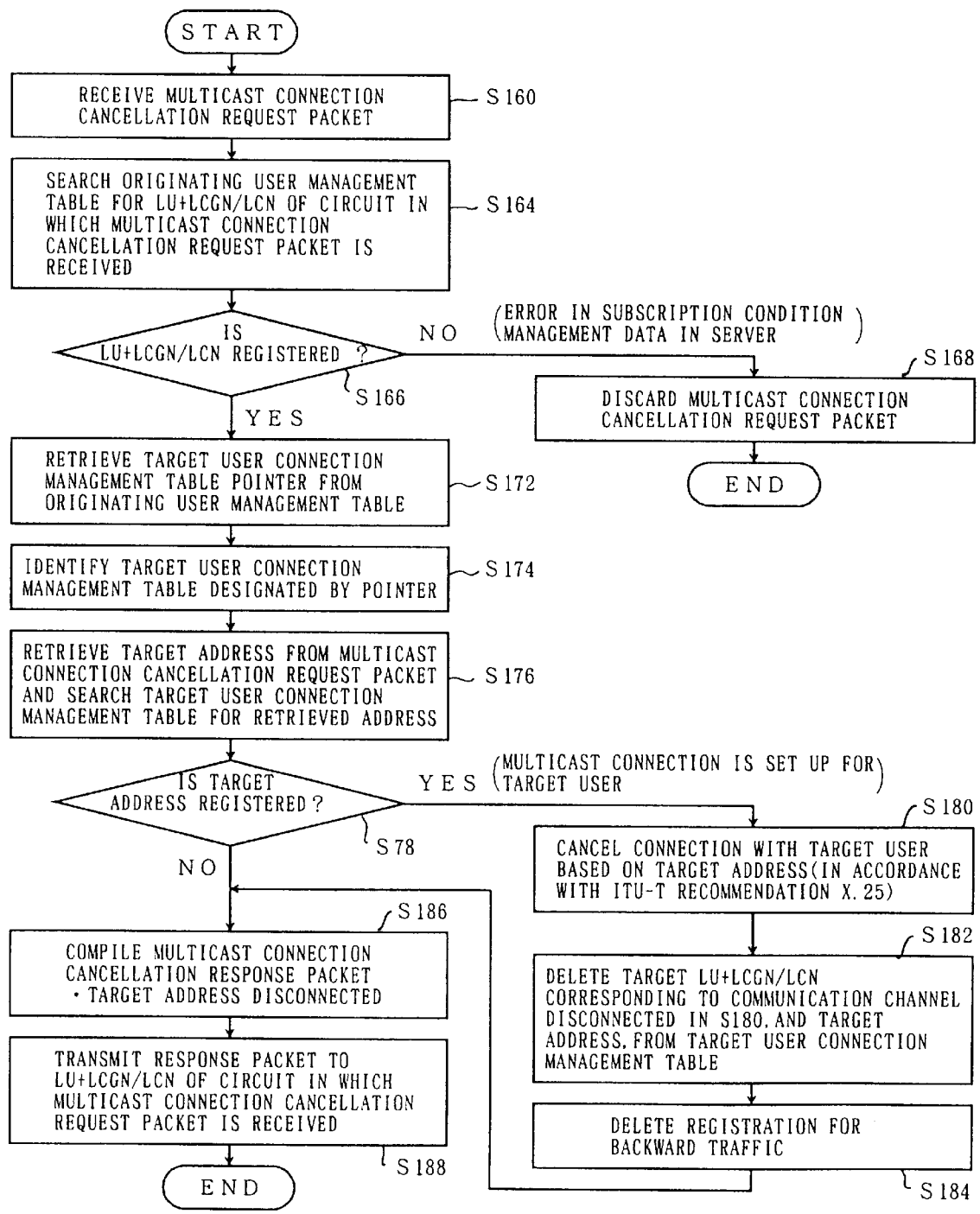
FIG. 21 is a flowchart of a process executed by the multicast server when a request for cancellation of multicast connection occurs.

FIG. 21 is a flowchart of a process executed by the multicast server 120 (registration deletion means M5) when a request for cancellation of multicast connection occurs. Referring to FIG. 21, the multicast server 120 receives a multicast connection cancellation request packet in step S160. In step S164, the multicast server 120 searches the originating user management table 128 for the LU+LCGN/LCN of a circuit in which the packet is received. In step S166, a determination is made as to whether the LU+LCGN/LCN is registered.

If the LU+LCGN/LCN is not registered, the multicast connection cancellation request packet received is discarded in step S168, whereupon the process is terminated. If the LU+LCGN/LCN is registered, the target user connection management table pointer is retrieved in step S172. In step S174, the target user connection management table 130 is identified based on the pointer. In step S176, the target address is retrieved from the multicast connection cancellation request packet. The target user connection management table 130 is searched for the target address. In step S178, a determination is made as to whether the target address is registered.

If the target address is registered, connection is canceled for the target user in step S180. In cancellation of connection, the SVC disconnection procedure complying with the ITU-T Recommendation X.25 is used. In step S182, the target address and the target LU+LCGN/LCN corresponding to a communication channel disconnected as a result of step S180 are deleted from the target user connection management table 130. In step S184, the originating LU+LCGN/LCN for backward traffic is deleted from the originating user management table 128. The LU+LCGN/LCN in the corresponding target user connection management table 130 is deleted. If the multicast connection cancellation request packet has a format shown in FIG. 18, steps S176–S184 are repeated as many times as the number of target addresses.

When it is determined in step S178 that the target address is not registered, or when step S184 is terminated, control is turned to step S186, where a multicast connection cancellation response packet for reporting the target address removed from registration is compiled. In step S188, the response packet compiled in step S186 is transmitted to the LC +LCGN/LCN of a circuit in which the multicast connection cancellation request packet is received, whereupon the process is terminated.

Figure 22:
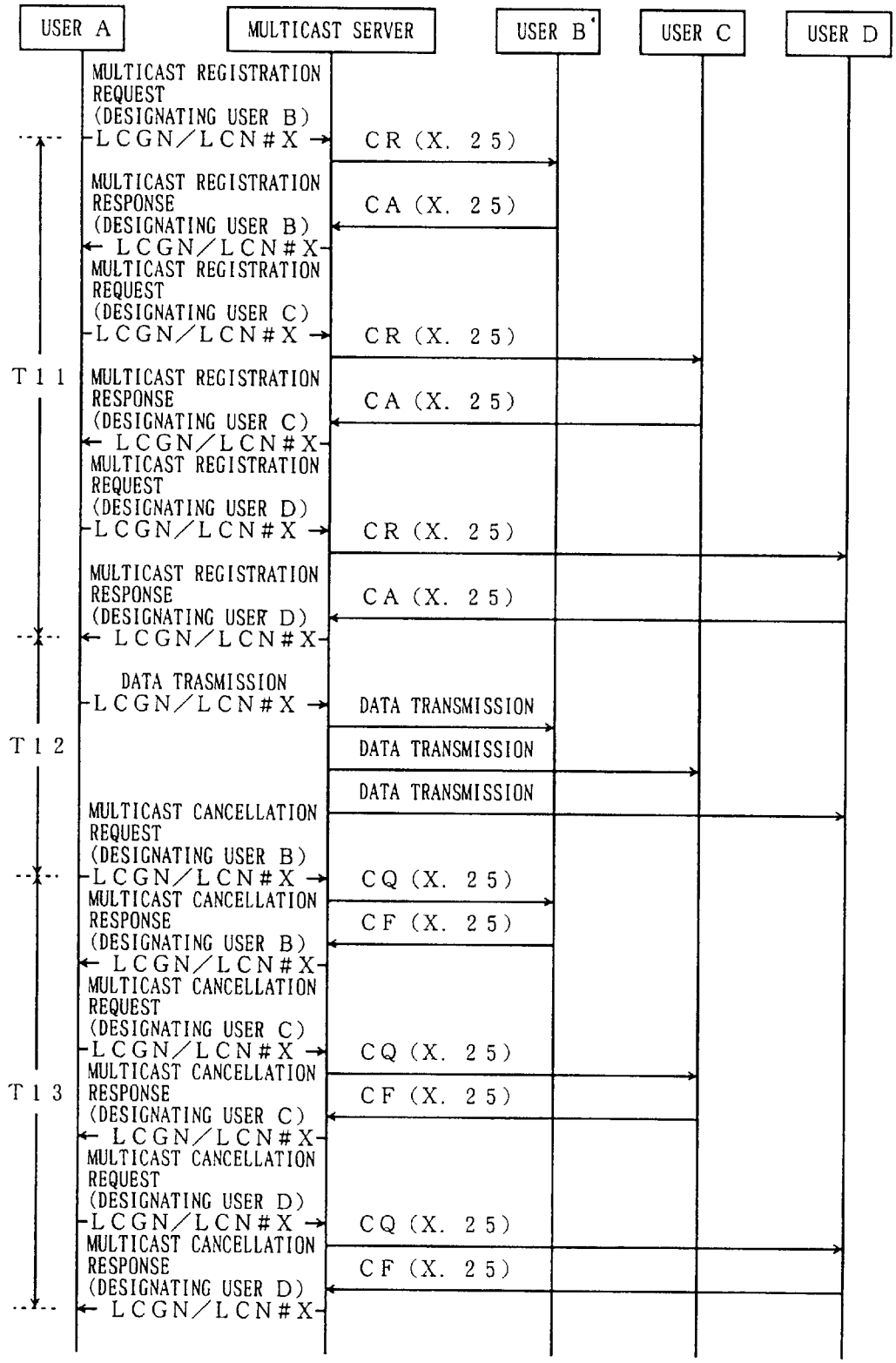
FIG. 22 shows a sequence of multicast registration cancellation in which a single target address is designated.

FIG. 22 shows a sequence of multicast registration cancellation in which a single target address is designated. Referring to FIG. 22, multicast connection registration is performed in period T11 according to the flowchart of FIG. 19. In period T12, multicast transmission of user data packet is performed according to the flowchart of FIG. 20. In period T13, multicast connection is canceled according to the flowchart of FIG. 21.

Figure 23:
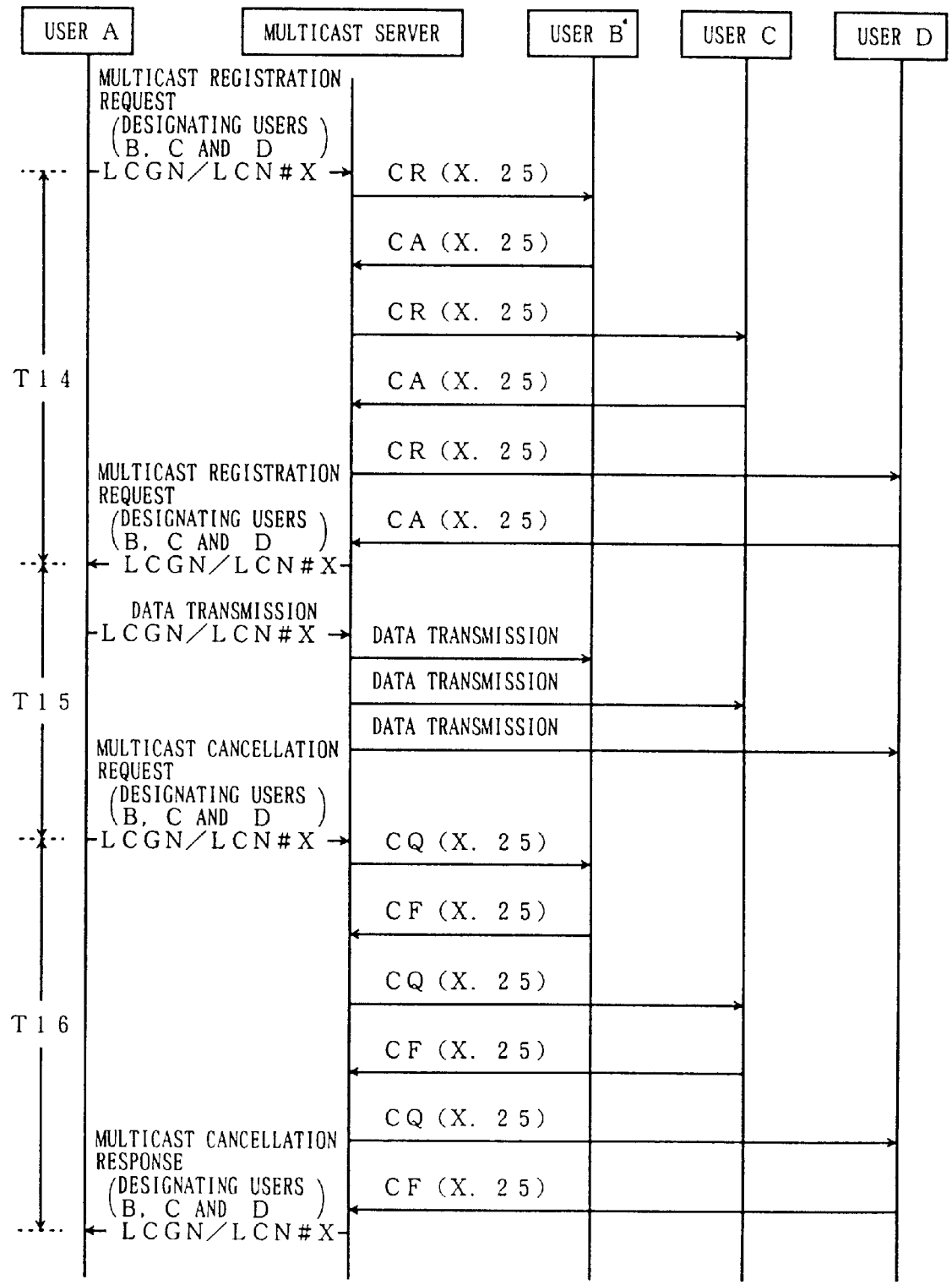
FIG. 23 shows a sequence of multicast registration cancellation in which a plurality of target addresses are designated.

FIG. 23 shows a sequence of multicast registration cancellation in which a plurality of target addresses are designated. Referring to FIG. 23, multicast connection registration is performed in period T14 according to the flowchart of FIG. 19. In period T15, multicast transmission of user data is performed according to the flowchart of FIG. 20. In period T16, cancellation of multicast connection is performed according to the flowchart of FIG. 21.

It is to be appreciated that the present invention provides multicast communication with a plurality of registered users having respective target addresses, by registering, in the target user connection management table, the target addresses and the circuit information in relation to the registered multicast service user, and by supplying user data from the registered multicast service user. By registering the target address and the associated user circuit information in the target user connection management table, the multicast connection group can be dynamically updated.

The present invention also provides deletion of the target address designated in the multicast connection cancellation request, from the target user connection management table, and deletion of the associated circuit information from the target user connection management table.

The present invention is not limited to the above-described embodiments, and variations and modifications may be made without departing from the scope of the present invention.

What is claimed is:

1. A multicast connection management system in a packet data communication network provided with a multicast server for providing a multicast service, comprising:

a plurality of target user connection management table means provided for subscribing multicast service users so as to register target addresses and circuit information of target users assigned the target addresses, in such a manner as to relate each of the target addresses to the corresponding circuit information;

an originating user management table means for registering the circuit information of the subscribing multicast service users and pointers for indicating one of said plurality of target user connection management table means in such a manner as to relate each of the pointers to the corresponding circuit information;

registration means for searching, in response to a request issued from the subscribing multicast service user for registration of multicast connection with one of the target addresses, the originating user management table means for the circuit information of a circuit carrying the request, so as to retrieve the pointer indicating one of said plurality of target user connection management table means, and for registering a requested target address specified by the request and the circuit information of the target user assigned the requested target address, in the target user connection management table means indicated by the pointer;

transmission means for transmitting, when the subscribing multicast service user supplies user data, said user data to the target user assigned the target address registered in said target user connection management table means indicated by the pointer obtained by searching said originating user management table means.

wherein said registration means registers the target address and the circuit information of the subscribing multicast service user issuing the request, in addition to the requested target address and the circuit information of the target user assigned the requested target address; and registration deletion means for deleting, in response to a request issued from the subscribing multicast service user for cancellation of the multicast connection, the target address of the multicast connection and the circuit information of the target user assigned the target address of the multicast connection, from the target user connection management table means indicated by the pointer.

2. A multicast connection management system in a packet data communication network provided with a multicast server for providing a multicast service, comprising:

a plurality of target user connection management table means provided for subscribing multicast service users so as to register target addresses and circuit information of target users assigned the target addresses, in such a manner as to relate each of the target addresses to the corresponding circuit information;

an originating user management table means for registering the circuit information of the subscribing multicast service users and pointers for indicating one of said plurality of target user connection management table means in such a manner as to relate each of the pointers to the corresponding circuit information;

registration means for searching, in response to a request issued from the subscribing multicast service user for registration of multicast connection with one of the target addresses, the originating user management table means for the circuit information of a circuit carrying the request, so as to retrieve the pointer indicating one of said plurality of target user connection management table means, and for registering a requested target address specified by the request and the circuit information of the target user assigned the requested target address, in the target user connection management table means indicated by the pointer;

transmission means for transmitting, when the subscribing multicast service user supplies user data, said user data to the target user assigned the target address registered in said target user connection management table means indicated by the pointer obtained by searching said originating user management table means; and registration deletion means for deleting, in response to a request issued from the subscribing multicast service user for cancellation of the multicast connection, the target address of the multicast connection and the circuit information of the target user assigned the target address of the multicast connection, from the target user connection management table means indicated by the pointer.

3. The multicast connection management system as claimed in claim 2, wherein said registration deletion means deletes the target address and the circuit information of the subscribing multicast service user issuing the request, in addition to the target address of the multicast connection and the circuit information of the target user assigned the target address of the multicast connection.

4. A multicast connection management system in a packet data communication network provided with a multicast server for providing a multicast service, comprising:

a plurality of target user connection management table means provided for subscribing multicast service users so as to register target addresses and circuit information of target users assigned the target addresses, in such a manner as to relate each of the target addresses to the corresponding circuit information;

an originating user management table means for registering the circuit information of the subscribing multicast service users and pointers for indicating one of said plurality of target user connection management table means in such a manner as to relate each of the pointers to the corresponding circuit information;

registration means for searching, in response to a request issued from the subscribing multicast service user for registration of multicast connection with one of the target addresses, the originating user management table means for the circuit information of a circuit carrying the request, so as to retrieve the pointer indicating one of said plurality of target user connection management table means, and for registering a requested target address specified by the request and the circuit information of the target user assigned the requested target address, in the target user connection management table means indicated by the pointer;

transmission means for transmitting, when the subscribing multicast service user supplies user data, said user data to the target user assigned the target address registered in said target user connection management table means indicated by the pointer obtained by searching said originating user management table means; and registration deletion means for deleting, in response to a request issued from the subscribing multicast service user for cancellation of the multicast connection, the target address of the multicast connection and the circuit information of the target user assigned the target address of the multicast connection, from the target user connection management table means indicated by the pointer, wherein said registrations means successively registers, in response to the request for registration of multicast connection, a plurality of requested target addresses and the circuit information of the target users assigned the plurality of requested target addresses, in the target user connection management able means.

5. A multicast connection management in a packet data communication network provided with a multicast server for providing a multicast service, comprising:

a plurality of target user connection management table means provided for subscribing multicast service users so as to register target addresses and circuit information of target users assigned the target addresses, in such a manner as to relate each of the target addresses to the corresponding circuit information;

an originating user management table means for registering the circuit information of the subscribing multicast service users and pointers for indicating one of said plurality of target user connection management table means in such a manner as to relate each of the pointers to the corresponding circuit information;

registration means for searching, in response to a request issued from the subscribing multicast service user for registration of multicast connection with one of the target addresses, the originating user management table means for the circuit information of a circuit carrying the request, so as to retrieve the pointer indicating one of said plurality of target user connection management table means, and for registering a requested target address specified by the request and the circuit information of the target user assigned the requested target address, in the target user connection management table means indicated by the pointer;

transmission means for transmitting, when the subscribing multicast service user supplies user data, said user data to the target user assigned the target address registered in said target user connection management table means indicated by the pointer obtained by searching said originating user management table means; and registering deletion means for deleting, in response to a request issued from the subscribing multicast service user for cancellation of the multicast connection, the target address of the multicast connection and the circuit information of the target user assigned the target address of the multicast connection, from the target user connection management table means indicated by the pointer, wherein said packet data communication network is a frame relay network.

6. A multicast connection management system in a packet data communication network provided with a multicast server for providing a multicast service, comprising:

a plurality of target user connection management table means provided for subscribing multicast service users so as to register target addresses and circuit information of target users assigned the target addresses, in such a manner as to relate each of the target addresses to the corresponding circuit information;

an originating user management table means for registering the circuit information of the subscribing multicast service users and pointers for indicating one of said plurality of target user connection management table means in such a manner as to relate each of the pointers to the corresponding circuit information;

registration means for searching, in response to a request issued from the subscribing multicast service user for registration of multicast connection with one of the target addresses, the originating user management table means for the circuit information of a circuit carrying the request, so as to retrieve the pointer indicating one of said plurality of target user connection management table means, and for registering a requested target address specified by the request and the circuit information of the target user assigned the requested target address, in the target user connection management table means indicated by the pointer;

transmission means for transmitting, when the subscribing multicast service user supplies user data, said user data to the target user assigned the target address registered in said target user connection management table means indicated by the pointer obtained by searching said originating user management table means; and registration deletion means for deleting, in response to a request issued from the subscribing multicast service user for cancellation of the multicast connection, the target address of the multicast connection and the circuit information of the target user assigned the target address of the multicast connection, from the target user connection management table means indicated by the pointer, wherein said packet data communication network is a packet switching communication network.

* * * * *